US010757687B2

(12) United States Patent
Hosseini et al.

(10) Patent No.: US 10,757,687 B2
(45) Date of Patent: Aug. 25, 2020

(54) TECHNIQUES FOR COMMUNICATING FEEDBACK IN LOW LATENCY WIRELESS COMMUNICATIONS

(71) Applicant: QUALCOMM Incorporated, San Diego, CA (US)

(72) Inventors: Seyedkianoush Hosseini, San Diego, CA (US); Shimman Arvind Patel, San Diego, CA (US); Wanshi Chen, San Diego, CA (US); Jing Sun, San Diego, CA (US); Peter Gaal, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 374 days.

(21) Appl. No.: 15/473,188

(22) Filed: Mar. 29, 2017

(65) Prior Publication Data

US 2017/0332369 A1 Nov. 16, 2017

Related U.S. Application Data

(60) Provisional application No. 62/335,626, filed on May 12, 2016, provisional application No. 62/417,700, filed on Nov. 4, 2016.

(51) Int. Cl.
*H04W 4/00* (2018.01)
*H04W 72/04* (2009.01)
*H04L 5/00* (2006.01)

(52) U.S. Cl.
CPC ....... *H04W 72/0413* (2013.01); *H04L 5/0048* (2013.01); *H04L 5/0051* (2013.01); *H04L 5/0055* (2013.01); *H04L 5/0064* (2013.01)

(58) Field of Classification Search
CPC .................................................... H04L 5/0051
See application file for complete search history.

(56) References Cited

U.S. PATENT DOCUMENTS 8,611,238 B2 * 12/2013 Papasakellariou .... H04L 5/0037
370/252
8,705,456 B2 * 4/2014 Zeira ..................... H04L 1/0026
370/329

(Continued)

FOREIGN PATENT DOCUMENTS

EP       2 942 896 A1   11/2015
WO  WO-2016/048595 A1    3/2016

OTHER PUBLICATIONS

ETSI "ETSI TS 136 211 V13.1.0", LTE; Evolved Universal Terrestrial Radio Access (E-UTRA); Physical channels and modulation, Release 13, Apr. 1, 2016, XP055339864, Retrieved from the Internet: URL:http://www.etsi.org/deliver/etsi_ts/136200_136299/136211/13.01.00_60/ts_136211 v1301 00p.pdf [retrieved on Jan. 27, 2017], 157 pages.

(Continued)

*Primary Examiner* — Guang W Li
(74) *Attorney, Agent, or Firm* — Arent Fox, LLP

(57) ABSTRACT

Various aspects described herein relate to communicating uplink control information (UCI) in low-latency communications. A resource assignment is received from an access point to transmit over a first symbol and a second symbol that comprise a first TTI, wherein the resource assignment includes, at least for the first symbol, an indication of one or more consecutive frequency resources in a system bandwidth based on a decimation factor. A reference signal is transmitted in the first TTI over the first symbol and a data signal indicating UCI over the second symbol according to the resource assignment.

30 Claims, 10 Drawing Sheets

(56) References Cited

U.S. PATENT DOCUMENTS

| | | | |
|---|---|---|---|
| 9,402,248 B2* | 7/2016 | Papasakellariou | H04L 1/1854 |
| 9,894,654 B2* | 2/2018 | Astely | H04L 5/0037 |
| 10,362,595 B2* | 7/2019 | Lee | H04L 5/0055 |
| 2012/0113831 A1* | 5/2012 | Pelletier | H04L 5/0053 370/252 |
| 2013/0028134 A1* | 1/2013 | Wang | H04L 5/0048 370/254 |
| 2014/0105110 A1* | 4/2014 | Hoshino | H04W 52/18 370/328 |
| 2015/0341156 A1* | 11/2015 | Yang | H04L 5/001 370/280 |
| 2015/0341923 A1* | 11/2015 | Yang | H04W 52/58 370/329 |
| 2016/0323077 A1* | 11/2016 | Yin | H04W 72/04 |
| 2017/0041103 A1* | 2/2017 | Maattanen | H04L 1/1671 |
| 2017/0171842 A1* | 6/2017 | You | H04L 5/0048 |
| 2017/0317794 A1* | 11/2017 | You | H04L 5/0051 |
| 2018/0006769 A1* | 1/2018 | Maattanen | H04L 1/1671 |
| 2018/0115984 A1* | 4/2018 | Sahlin | H04W 72/1268 |

OTHER PUBLICATIONS

International Search Report and Written Opinion—PCT/US2017/025060—ISA/EPO—dated Jun. 27, 2017. (17 total pages).

LG Electronics: "Discussion on PUCCH Design for HARQ-ACK in shortened TTI", 3GPP TSG RAN WG1 Meeting #84bis, R1-163520, Apr. 18, 2016, XP051097129, 7 pages, Retrieved from the Internet: URL:http://www.3gpp.org/ftp/tsg_ran/WG1_RL1/TSGR1_84b/Docs/ [retrieved on Apr. 18, 2016].

NTT Docomo et al., "UL Aspects of TTI Shortening", 3GPP TSG RAN WG1 Meeting #84, R1-160965, Feb. 14, 2016, XP051054272, Retrieved from the Internet: URL:http://www.3gpp.org/ftp/Meetings_3GPP_SYNC/RAN1/Docs/, 8 pages.

Qualcomm Incorporated: "UL Channel Design for Shortened TTI", 3GPP TSG RAN WG1 #84b, R1-163069, Apr. 2, 2016, XP051080513, Retrieved from the Internet: URL:http://www.3gpp.org/ftp/tsg_ran/WG1_RL1/TSGR1_84b/Docs/, 8 pages.

ZTE: "PUCCH Design for Shortened TTI", 3GPP TSG RAN WG1 Meeting #84bis, R1-162403, Apr. 2, 2016, XP051080176, 5 pages, Retrieved from the Internet: URL:http://www.3gpp.org/ftp/tsg_ran/WG1_RL1/TSGR1_84b/Docs/.

Qualcomm Inc: "Details on Increasing Number of Combs for SRS", 3GPP TSG-RAN WG1 #83, 3GPP Draft; R1-157054, Nov. 15, 2015, 4 Pages, Nov. 15, 2015-Nov. 22, 2015, XP051039993 Retrieved from the Internet: URL: http://www.3gpp.org/ftp/Meetings_3GPP_SYNC/RAN1/Docs/ [retrieved on Nov. 15, 2015].

* cited by examiner

US 10,757,687 B2

TECHNIQUES FOR COMMUNICATING FEEDBACK IN LOW LATENCY WIRELESS COMMUNICATIONS

CLAIM OF PRIORITY UNDER 35 U.S.C. § 119

The present application for patent claims priority to Provisional Application No. 62/335,626, entitled "TECHNIQUES FOR COMMUNICATING FEEDBACK IN LOW LATENCY WIRELESS COMMUNICATIONS" filed May 12, 2016, and Provisional Application No. 62/417,700, entitled "TECHNIQUES FOR COMMUNICATING FEEDBACK IN LOW LATENCY WIRELESS COMMUNICATIONS" filed Nov. 4, 2016, which are assigned to the assignee hereof and hereby expressly incorporated by reference herein for all purposes.

BACKGROUND

Described herein are aspects generally related to communication systems, and more particularly, to communicating feedback in low latency communication systems.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of a telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, further improvements in LTE technology may be desired. Preferably, these improvements should be applicable to other multi-access technologies and the telecommunication standards that employ these technologies.

In wireless communication systems employing legacy LTE, a plurality of UEs served by a particular eNodeB may be scheduled resources for communicating with the eNodeB over one or more channels using transmission time intervals (TTI) on the order of a 1 millisecond subframe. As UE capabilities and demand for bandwidth increases, lower latency in communications may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for communicating uplink control information (UCI) in low-latency communications is provided. The method includes receiving a resource assignment from an access point to transmit over a first symbol and a second symbol that comprise a first TTI, wherein the resource assignment includes, at least for the first symbol, an indication of one or more consecutive frequency resources in a system bandwidth based on a decimation factor, and transmitting, in the first TTI, a reference signal over the first symbol and a data signal indicating UCI over the second symbol according to the resource assignment.

In other aspects, a method for communicating uplink control information (UCI) in low-latency communications is provided. The method includes transmitting a resource assignment for a user equipment to transmit over a first symbol and a second symbol that comprise a first TTI, wherein the resource assignment includes, at least for the first symbol, an indication of one or more consecutive frequency resources in a system bandwidth based on a decimation factor, and receiving, in the first TTI, a reference signal over the first symbol and a data signal indicating UCI over the second symbol according to the resource assignment.

In a further aspect, an apparatus for wireless communications is provided. The apparatus includes a transceiver for communicating one or more wireless signals via one or more antennas, a memory configured to store instructions, and one or more processors communicatively coupled with the transceiver and the memory. The one or more processors are configured to receive one or more resource assignments from an access point to transmit over a first symbol and a second symbol that comprise a first TTI, wherein a resource assignment of the one or more resource assignments includes, at least for the first symbol, an indication of one or more consecutive frequency resources in a system bandwidth based on a decimation factor, and transmit, in the first TTI, a reference signal over the first symbol and a data signal indicating UCI over the second symbol according to the one or more resource assignments.

In another aspect, an apparatus for wireless communications is provided including a transceiver for communicating one or more wireless signals via one or more antennas, a memory configured to store instructions, and one or more processors communicatively coupled with the transceiver and the memory. The one or more processors are configured to transmit one or more resource assignments for a user equipment to transmit over a first symbol and a second symbol that comprise a first TTI, wherein at least one resource assignment of the one or more resource assignments includes, at least for the first symbol, an indication of one or more consecutive frequency resources in a system bandwidth based on a decimation factor, and receive, in the first TTI, a reference signal over the first symbol and a data signal indicating UCI over the second symbol according to the one or more resource assignments.

In a further aspect, an apparatus for wireless communications is provided. The apparatus includes means for receiving one or more resource assignments from an access point to transmit over a first symbol and a second symbol that comprise a first TTI, wherein a resource assignment of the one or more resource assignments includes, at least for the first symbol, an indication of one or more consecutive frequency resources in a system bandwidth based on a decimation factor, and means for transmitting, in the first TTI, a reference signal over the first symbol and a data signal indicating UCI over the second symbol according to the one or more resource assignments.

In another aspect, an apparatus for wireless communications is provided including means for transmitting one or more resource assignments for a user equipment to transmit over a first symbol and a second symbol that comprise a first TTI, wherein at least one resource assignment of the one or more resource assignments includes, at least for the first symbol, an indication of one or more consecutive frequency resources in a system bandwidth based on a decimation factor, and means for receiving, in the first TTI, a reference signal over the first symbol and a data signal indicating UCI over the second symbol according to the one or more resource assignments.

In a further aspect, a computer-readable medium including computer executable code for wireless communications is provided. The code includes code for receiving one or more resource assignments from an access point to transmit over a first symbol and a second symbol that comprise a first TTI, wherein a resource assignment of the one or more resource assignments includes, at least for the first symbol, an indication of one or more consecutive frequency resources in a system bandwidth based on a decimation factor, and code for transmitting, in the first TTI, a reference signal over the first symbol and a data signal indicating UCI over the second symbol according to the one or more resource assignments.

In another aspect, a computer-readable medium including computer executable code for wireless communications is provided. The code includes code for transmitting one or more resource assignments for a user equipment to transmit over a first symbol and a second symbol that comprise a first TTI, wherein at least one resource assignment of the one or more resource assignments includes, at least for the first symbol, an indication of one or more consecutive frequency resources in a system bandwidth based on a decimation factor, and code for receiving, in the first TTI, a reference signal over the first symbol and a data signal indicating UCI over the second symbol according to the one or more resource assignments.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

In order to facilitate a fuller understanding of aspects described herein, reference is now made to the accompanying drawings, in which like elements are referenced with like numerals. These drawings should not be construed as limiting the present disclosure, but are intended to be illustrative only.

DETAILED DESCRIPTION

Figure 1:
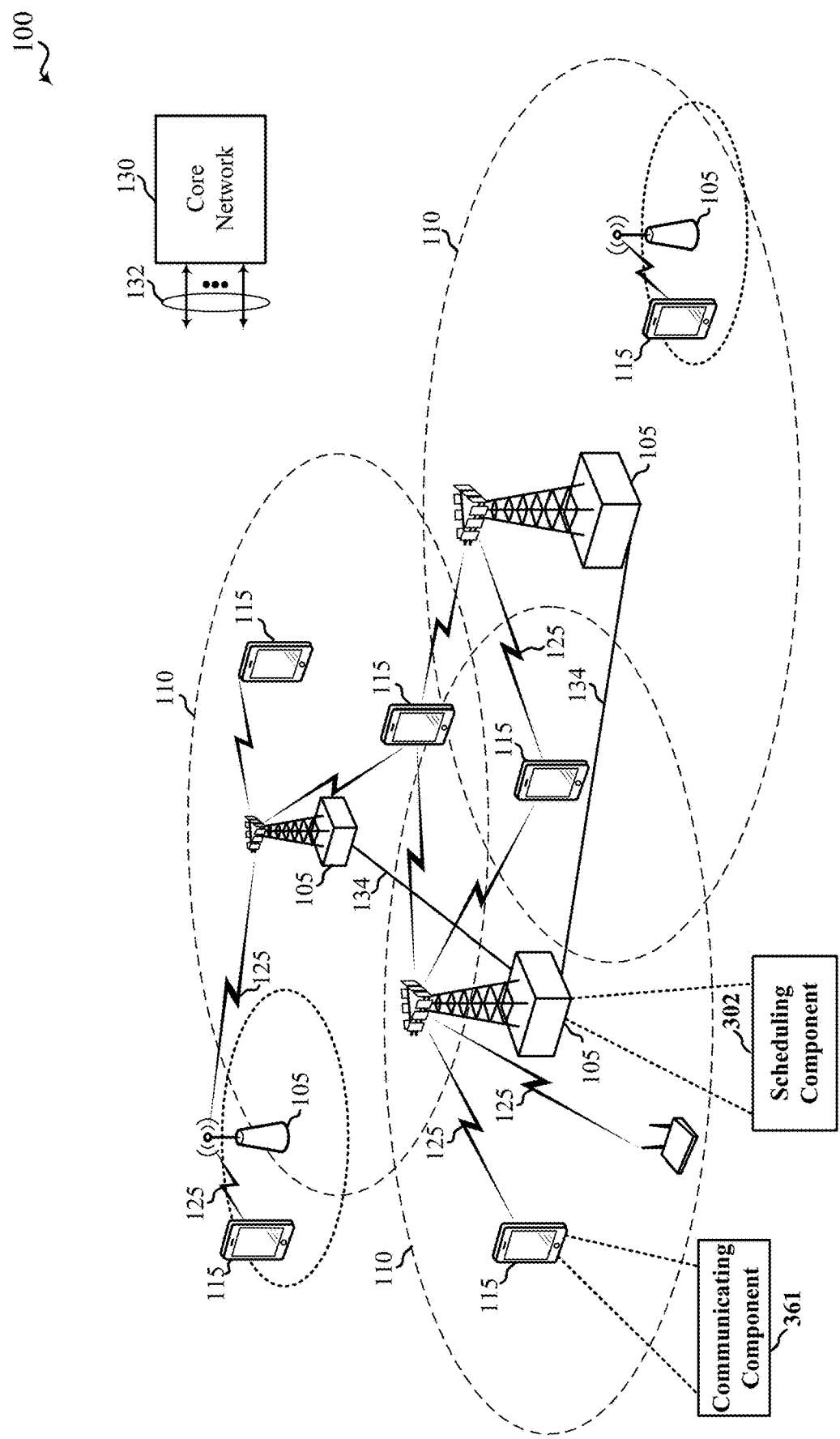
FIG. 1 shows a block diagram conceptually illustrating an example of a telecommunications system, in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Described herein are various aspects related to communicating feedback in a low latency communication technology (e.g., ultra-low latency (ULL) LTE). For example, a low latency communication technology may be based on a legacy wireless communication technology, such as third generation partnership project (3GPP) long term evolution (LTE), but may utilize different length transmission time intervals (TTI) (e.g., the low latency communication technology may have a shorter TTI duration than the legacy communication technology). For example, a legacy LTE technology may utilize a TTI having a duration of a subframe defined in LTE (e.g., 1 millisecond), where ULL LTE technology can be based on a TTI having a duration less than a subframe. In an example, the TTI and associated duration of ULL LTE can be based on defined portions of a subframe, such as one symbol, two symbols, a subframe slot, etc., where a subframe can have 12-14 symbols, two slots, etc. In this regard, a lower latency in communications is achieved by the shorter, more frequent TTI.

In a low latency communication technology using a two-symbol TTI, a demodulation reference signal (DMRS) and control data (e.g., uplink control information (UCI)) may be transmitted in each symbol using frequency hopping to provide frequency diversity. In some configurations, however, one of the two symbols may be reserved for DMRS transmissions and the other for data transmissions. In such configurations, frequency hopping across multiple symbols may not be usable. For example, the symbol used for data transmission may use a cyclic shift selected to indicate UCI. In another example, resources over the symbol used for data transmission may be assigned to one or more UEs based on a decimation factor to provide the UEs with multiple bits to transmit UCI. In an example, the resources may be assigned based on UCI payload for a given UE (e.g., whether the UE is to transmit acknowledgement (ACK)/negative-ACK (HACK) feedback, channel quality indicator (CQI) feedback, and/or the like). Moreover, in an example, the symbol reserved for DMRS transmission may be similarly divided for assigning frequency resources (e.g., subcarriers, tones, etc.) to the UEs based on the same or a different decimation factor to maintain orthogonality of the DMRS transmissions.

In addition, for example, in some TTIs, both symbols may be assigned for transmitting data, and may depend on a reference signal in a previous TTI for channel estimation/demodulation of the data. This can reduce DMRS overhead otherwise caused by allocating one of the two symbols for DMRS transmission in each TTI. Additionally, TTIs having two assigned data symbols may be used to transmit more UCI (e.g., ACK/NACK and CQI as opposed to one or the other) as opposed to a TTI having one or two symbols assigned for reference signals and/or control data. Moreover, though the concepts described above and herein are generally shown as corresponding to a two-symbol TTI, similar concepts may be applied to TTIs having two or more symbols where at least one symbol in at least one TTI is assigned for reference signal transmission.

Referring first to FIG. 1, a diagram illustrates an example of a wireless communications system 100, in accordance with aspects described herein. The wireless communications system 100 includes a plurality of access points (e.g., base stations, eNBs, or WLAN access points) 105, a number of user equipment (UEs) 115, and a core network 130. Access points 105 may include a scheduling component 302 configured to allocate resources for communicating with UEs 115 using a ULL communication technology to receive UCI transmissions therefrom. Similarly, one or more of UEs 115 may include a communicating component 361 configured to communicate with one or more access points 105 using the ULL communication technology (e.g., ULL LTE) to transmit UCI. Some of the access points 105 may communicate with the UEs 115 under the control of a base station controller (not shown), which may be part of the core network 130 or the certain access points 105 (e.g., base stations or eNBs) in various examples. Access points 105 may communicate control information and/or user data with the core network 130 through backhaul links 132. In examples, the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

In some examples, at least a portion of the wireless communications system 100 may be configured to operate on multiple hierarchical layers in which one or more of the UEs 115 and one or more of the access points 105 may be configured to support transmissions on a hierarchical layer that has a reduced latency with respect to another hierarchical layer. In some examples, a UE 115 may communicate with access point 105 on one or more of a first hierarchical layer that supports first layer transmissions using a first TTI (which may relate to a "legacy communication technology") and a second hierarchical layer that supports second layer transmissions using a second TTI, which may be shorter than the first TTI (which may relate to a "ULL communication technology").

In other examples, a UE 115 may communicate with an access point 105 on the second hierarchical layer only. Thus, a UE 115 may belong to a second class of UEs 115 that may communicate on the second hierarchical layer, while another UE 115 may belong to a first class of UEs 115 that may communicate on the first hierarchical layer only. In an example, access point 105 and UE 115 may communicate on the second hierarchical layer through transmissions of subframes of a second subframe type. Access point 105 may transmit communications related to the first or second hierarchical layer only or may transmit communications for both the first and second hierarchical layers. Where an access point 105 supports both the first and second hierarchical layers, communicating component 361 can be configured to prioritize communications received from the access point 105 that relate to the first and second hierarchical layers, as described herein.

The access points 105 may wirelessly communicate with the UEs 115 via one or more access point antennas. Each of the access points 105 sites may provide communication coverage for a respective coverage area 110. In some examples, access points 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies (RAT). The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In network communication systems using LTE/LTE-A and/or ULL LTE communication technologies, the terms evolved Node B (eNodeB or eNB) may be generally used to describe the access points 105. The wireless communications system 100 may be a Heterogeneous LTE/LTE-A/ULL LTE network in which different types of access points provide coverage for various geographical regions. For example, each access point 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs 115 with service subscriptions with the network provider. A small cell would generally cover a relatively smaller geographic area and may allow unrestricted access by UEs 115 with service subscriptions with the network provider, for example, and in addition to unrestricted access, may also provide restricted access by UEs 115 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may support one or multiple (e.g., two, three, four, and the like) cells.

The core network 130 may communicate with the eNBs or other access points 105 via one or more backhaul links 132 (e.g., S1 interface, etc.). The access points 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the access points 105 may have similar frame timing, and transmissions from different access points 105 may be approximately aligned in time. For asynchronous operation, the access points 105 may have different frame timing, and transmissions from different access points 105 may not be aligned in time. Furthermore, transmissions in the first hierarchical layer and second hierarchical layer may or may not be synchronized among access points 105. The techniques described herein may be used for either synchronous or asynchronous operations.

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNodeBs, small cell eNodeBs, relays, and the like. A UE 115 may also be able to communicate over different access networks, such as cellular or other WWAN access networks, or WLAN access networks.

The communication links 125 shown in wireless communications system 100 may include uplink (UL) transmissions from a UE 115 to an access point 105, and/or downlink (DL) transmissions, from an access point 105 to a UE 115. The downlink transmissions may also be called forward link transmissions while the uplink transmissions may also be called reverse link transmissions. The communication links 125 may carry transmissions of each hierarchical layer which, in some examples, may be multiplexed in the communication links 125. The UEs 115 may be configured to collaboratively communicate with multiple access points 105 through, for example, Multiple Input Multiple Output (MIMO), carrier aggregation (CA), Coordinated Multi-Point (CoMP), or other schemes. MIMO techniques use multiple antennas on the access points 105 and/or multiple antennas on the UEs 115 to transmit multiple data streams. Carrier aggregation may utilize two or more component carriers on a same or different serving cell for data transmission. CoMP may include techniques for coordination of transmission and reception by a number of access points 105 to improve overall transmission quality for UEs 115 as well as increasing network and spectrum utilization.

As mentioned, in some examples access points 105 and UEs 115 may utilize carrier aggregation to transmit on multiple carriers. In some examples, access points 105 and UEs 115 may concurrently transmit in a first hierarchical layer, within a frame, one or more subframes each having a first subframe type using two or more separate carriers. Each carrier may have a bandwidth of, for example, 20 MHz, although other bandwidths may be utilized. A UE 115 may, in certain examples, receive and/or transmit one or more subframes in a second hierarchical layer utilizing a single carrier that has a bandwidth greater than a bandwidth of one or more of the separate carriers. For example, if four separate 20 MHz carriers are used in a carrier aggregation scheme in the first hierarchical layer, a single 80 MHz carrier may be used in the second hierarchical layer. The 80 MHz carrier may occupy a portion of the radio frequency spectrum that at least partially overlaps the radio frequency spectrum used by one or more of the four 20 MHz carriers. In some examples, scalable bandwidth for the second hierarchical layer type may be combined techniques to provide shorter RTTs such as described above, to provide further enhanced data rates.

Each of the different operating modes that may be employed by wireless communications system 100 may operate according to frequency division duplexing (FDD) or time division duplexing (TDD). In some examples, different hierarchical layers may operate according to different TDD or FDD modes. For example, a first hierarchical layer may operate according to FDD while a second hierarchical layer may operate according to TDD. In some examples, OFDMA communications signals may be used in the communication links 125 for LTE downlink transmissions for each hierarchical layer, while single carrier frequency division multiple access (SC-FDMA) communications signals may be used in the communication links 125 for LTE uplink transmissions in each hierarchical layer.

In an example, an access point 105 can assign resources to a UE 115 to communicate using a ULL communication technology having a TTI less than a subframe in duration. For example, the ULL communication technology may have at least a two-symbol TTI where one symbol in at least one TTI is used to transmit a reference signal (e.g., DMRS). In this example, scheduling component 302 can generate a resource assignment for the UE 115 to transmit the reference signal over one or more consecutive frequency resources based on a decimation factor to allow the UE 115 and other UEs to transmit orthogonal reference signals in at least one symbol of at least one TTI. In another example, scheduling component may generate the resource assignment for the UE 115 to similarly transmit UCI in another symbol (e.g., a second symbol of the TTI, a plurality of symbols of another TTI, etc.) similarly over one or more consecutive frequency resources based on the same or a different decimation factor. The UE 115 may select a cyclic shift for transmitting data signals over this symbol to indicate UCI. In an example, access point 105 may assign a number of frequency resources to the UE 115 based on a payload of the UCI (e.g., more frequency resource assignments may allow for more possible cyclic shifts to indicate more UCI bits). In a specific example, the access point 105 may assign all frequency resources of the symbol to the UE 115, or may assign a portion of the frequency resources to the UE 115 and other portions to other UEs.

Figure 2:
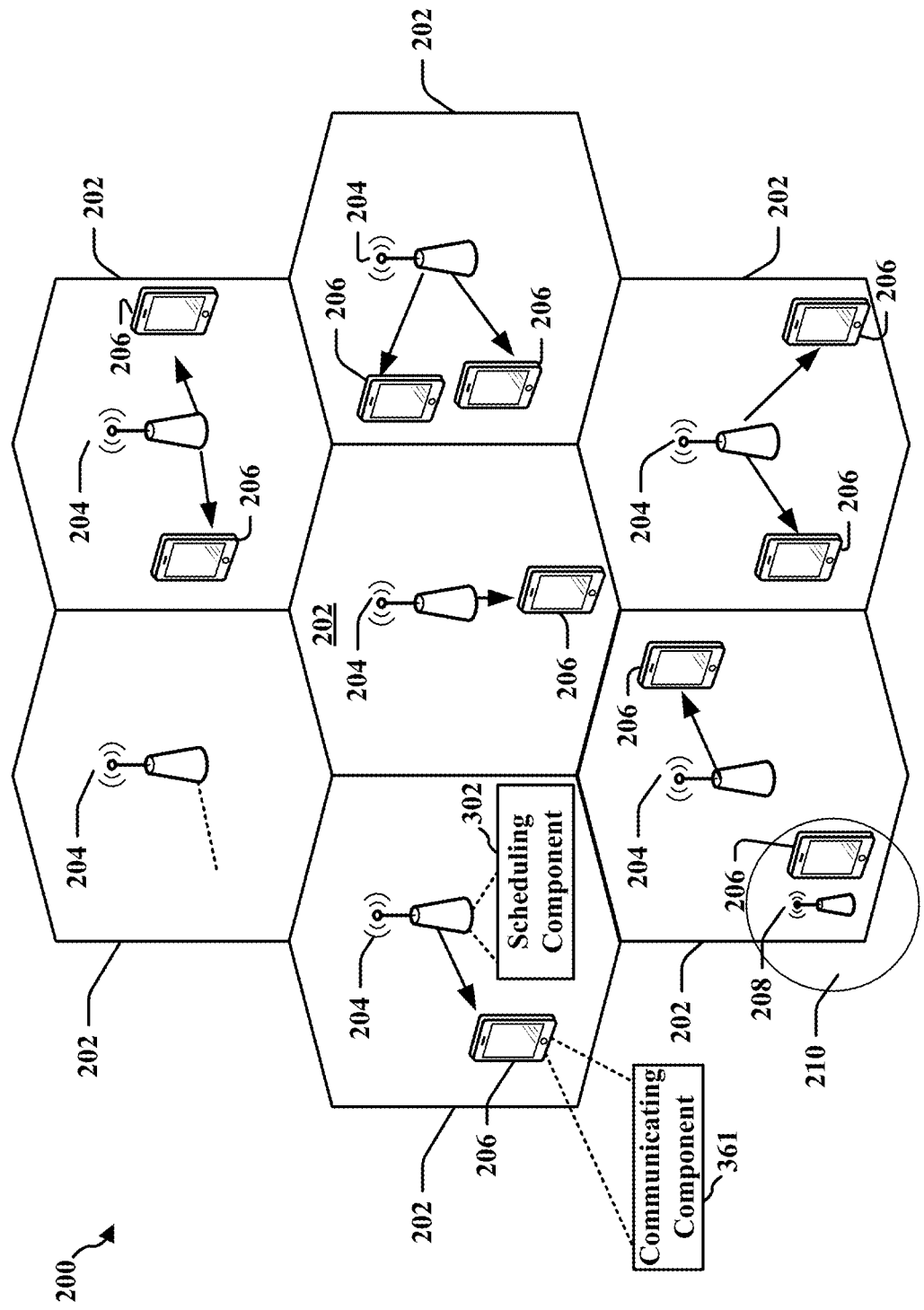
FIG. 2 is a diagram illustrating an example of an access network.

FIG. 2 is a diagram illustrating an example of an access network 200 in an LTE or ULL LTE network architecture. In this example, the access network 200 is divided into a number of cellular regions (cells) 202. One or more small cell eNBs 208 may have cellular regions 210 that overlap with one or more of the cells 202. The small cell eNBs 208 may provide one or more cells of a lower power class, such as a femto cell (e.g., home eNB (HeNB)), pico cell, micro cell, or remote radio head (RRH). The macro eNBs 204 are each assigned to a respective cell 202 and are configured to provide an access point to the core network 130 for all the UEs 206 in the cells 202. In an aspect, eNBs 204 and/or 208 may include scheduling component 302 configured to allocate resources for communicating with UEs 206 using a ULL communication technology to receive UCI transmission therefrom. Similarly, one or more of UEs 206 may include a communicating component 361 configured to communicate with one or more eNBs 204 and/or 208 using the ULL communication technology (e.g., ULL LTE) to transmit UCI. There is no centralized controller in this example of an access network 200, but a centralized controller may be used in alternative configurations. The eNBs and/or 208 204 can be responsible for all radio related functions including radio bearer control, admission control, mobility control, scheduling, security, and connectivity to one or more components of core network 130.

The modulation and multiple access scheme employed by the access network 200 may vary depending on the particular telecommunications standard being deployed. In LTE or ULL LTE applications, OFDM may be used on the DL and SC-FDMA may be used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 and/or 208 may have multiple antennas supporting MIMO technology. The use of MIMO technology enables the eNBs 204 and/or 208 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 and/or 208 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
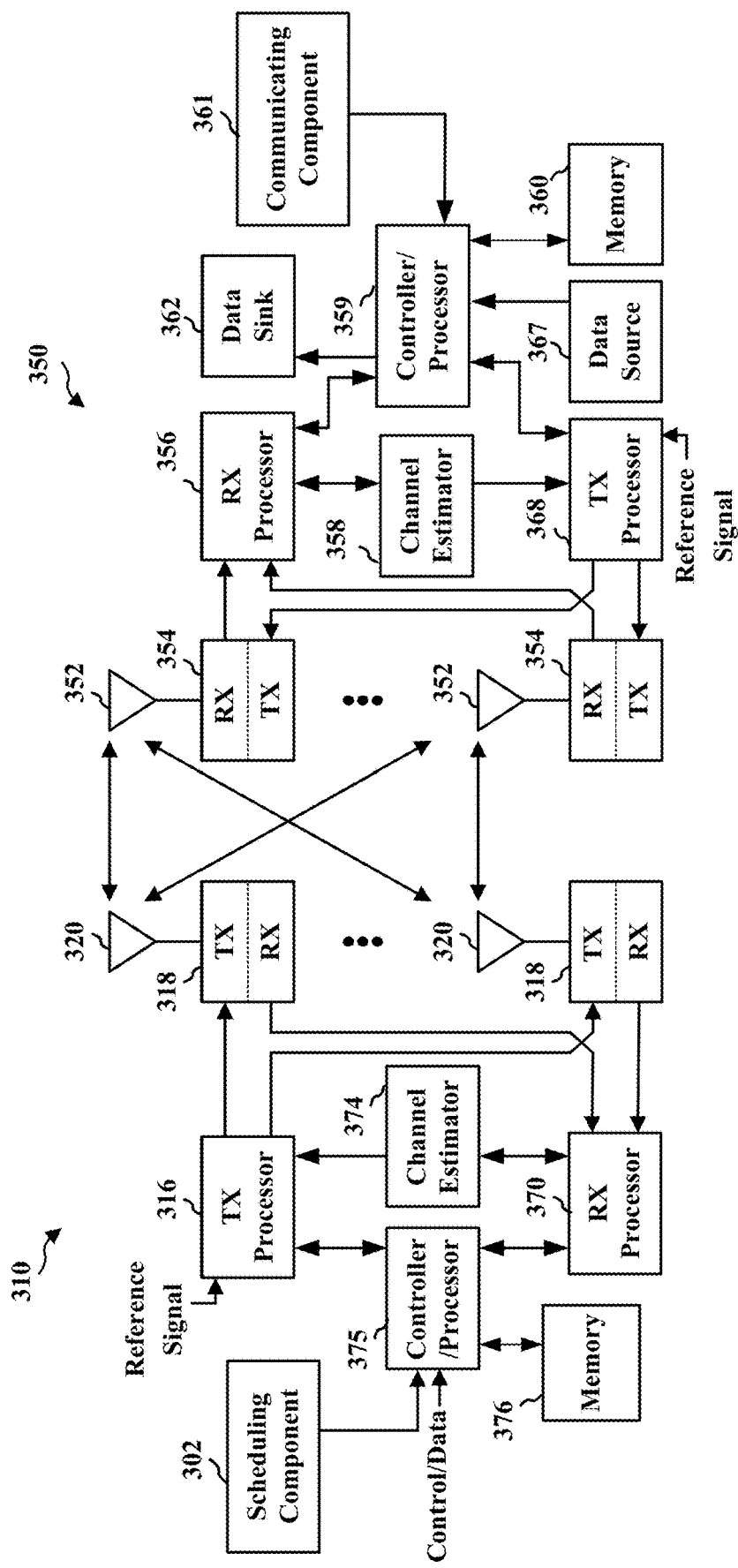
FIG. 3 is a diagram illustrating an example of an evolved Node B and user equipment in an access network.

FIG. 3 is a block diagram of an eNB 310 in communication with a UE 350 in an access network. In the DL, upper layer packets from the core network are provided to a controller/processor 375. The controller/processor 375 implements the functionality of the L2 layer. In the DL, the controller/processor 375 provides header compression, ciphering, packet segmentation and reordering, multiplexing between logical and transport channels, and radio resource allocations to the UE 350 based on various priority metrics. The controller/processor 375 is also responsible for HARQ operations, retransmission of lost packets, and signaling to the UE 350.

The transmit (TX) processor 316 implements various signal processing functions for the L1 layer (i.e., physical layer). The signal processing functions includes coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot signal) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream is then provided to a different antenna 320 via a separate transmitter 318TX. Each transmitter 318TX modulates an RF carrier with a respective spatial stream for transmission.

In addition, eNB 310 may include scheduling component 302 configured to allocate resources for communicating with a UE 350 using a ULL communication technology to receive UCI transmissions therefrom. Though scheduling component 302 is shown as coupled with controller/processor 375, substantially any processor of an eNB 310 can provide the functions of the scheduling component 302 and/or its related components described herein (e.g., in conjunction with controller/processor 375, memory 376, or otherwise). For example, TX processor 316 and/or RX processor 370 can additionally or alternatively provide one or more functions of scheduling component 302, as described herein.

At the UE 350, each receiver 354RX receives a signal through its respective antenna 352. Each receiver 354RX recovers information modulated onto an RF carrier and provides the information to the receive (RX) processor 356. The RX processor 356 implements various signal processing functions of the L1 layer. The RX processor 356 performs spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359.

The controller/processor 359 implements the L2 layer. The controller/processor can be associated with a memory 360 that stores program codes and data. The memory 360 may be referred to as a computer-readable medium. In the UL, the controller/processor 359 provides demultiplexing between transport and logical channels, packet reassembly, deciphering, header decompression, control signal processing to recover upper layer packets from the core network. The upper layer packets are then provided to a data sink 362, which represents all the protocol layers above the L2 layer. Various control signals may also be provided to the data sink 362 for L3 processing. The controller/processor 359 is also responsible for error detection using an acknowledgement (ACK) and/or negative acknowledgement (NACK) protocol to support HARQ operations.

In addition, UE 350 may include a communicating component 361 configured to communicate with one or more access points 105 using the ULL communication technology (e.g., ULL LTE) to transmit UCI. Though communicating component 361 is shown as coupled with controller/processor 359, substantially any processor of a UE 350 can provide the functions of the communicating component 361 and/or its related components described herein (e.g., in conjunction with controller/processor 359, memory 360, or otherwise). For example, TX processor 368 and/or RX processor 356 can additionally or alternatively provide one or more functions of communicating component 361, as described herein.

In the UL, a data source 367 is used to provide upper layer packets to the controller/processor 359. The data source 367 represents all protocol layers above the L2 layer. Similar to the functionality described in connection with the DL transmission by the eNB 310, the controller/processor 359 implements the L2 layer for the user plane and the control plane by providing header compression, ciphering, packet segmentation and reordering, and multiplexing between logical and transport channels based on radio resource allocations by the eNB 310. The controller/processor 359 is also responsible for HARQ operations, retransmission of lost packets, and signaling to the eNB 310.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 are provided to different antenna 352 via separate transmitters 354TX. Each transmitter 354TX modulates an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The RX processor 370 may implement the L1 layer.

The controller/processor 375 implements the L2 layer. The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover upper layer packets from the UE 350. Upper layer packets from the controller/processor 375 may be provided to the core network. The controller/processor 375 is also responsible for error detection using an ACK and/or NACK protocol to support HARQ operations.

Figure 4:
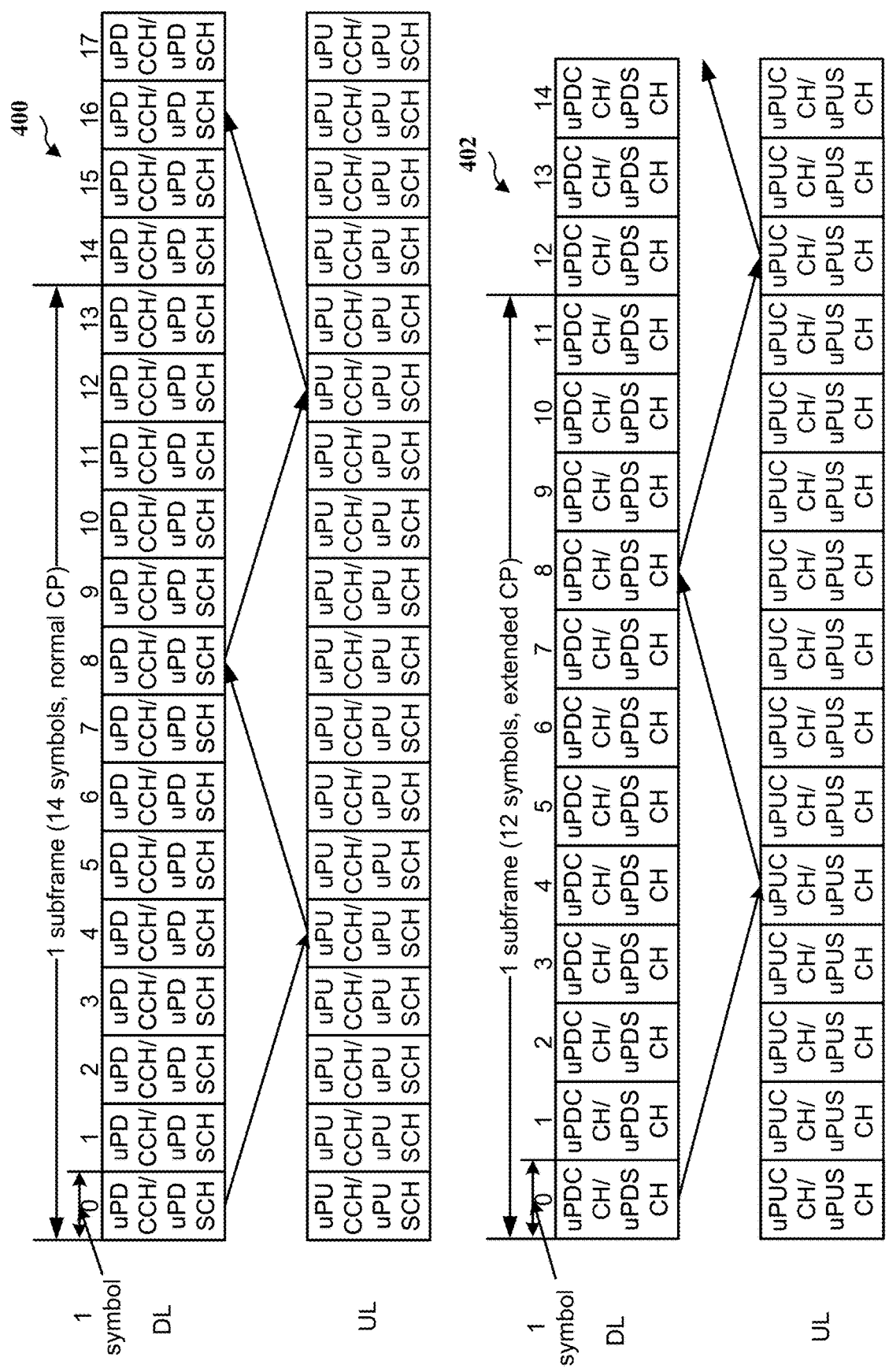
FIG. 4 is a diagram illustrating examples of timelines for ultra low latency (ULL) bandwidth allocation.

FIG. 4 is a diagram illustrating non-limiting examples of ULL timelines 400, 402, with time progression extending from left to right in the figure, for managing ULL communications in a wireless communication system. In this example, timelines 400, 402 include ULL frames of symbol duration in each symbol of a subframe. Timelines 400, 402 both depict symbols representing a TTI for ULL physical downlink control channel (uPDCCH) and/or ULL physical downlink shared channel (uPDSCH) and symbols representing a TTI including ULL physical uplink control channel (uPUCCH) and/or ULL physical uplink shared channel (uPUSCH). In timelines 400, 14 symbols are shown within a given subframe (e.g., for normal CP), and in timelines 402, 12 symbols are shown within a given subframe (e.g., for extended CP). In either case, lower latency is achieved in ULL by utilizing symbol-based TTIs. In other examples, a TTI may be two or more symbols, a slot of a subframe (where a subframe includes two slots), etc. In addition, HARQ process response time can be 3 symbols (or 4 symbols, 3 dual-symbols, 3 slots, etc.). In the depicted example, uPDCCH/uPDSCH is sent in symbol 0, and HARQ is processed and is sent in symbol 4, etc. in the subframe. Moreover, in accordance with aspects described herein, some symbols within a given subframe can be allocated for downlink communications (e.g., uPDCCH/uPDSCH) while other symbols are allocated for uplink communications (e.g., uPUCCH/uPUSCH).

Figure 5:
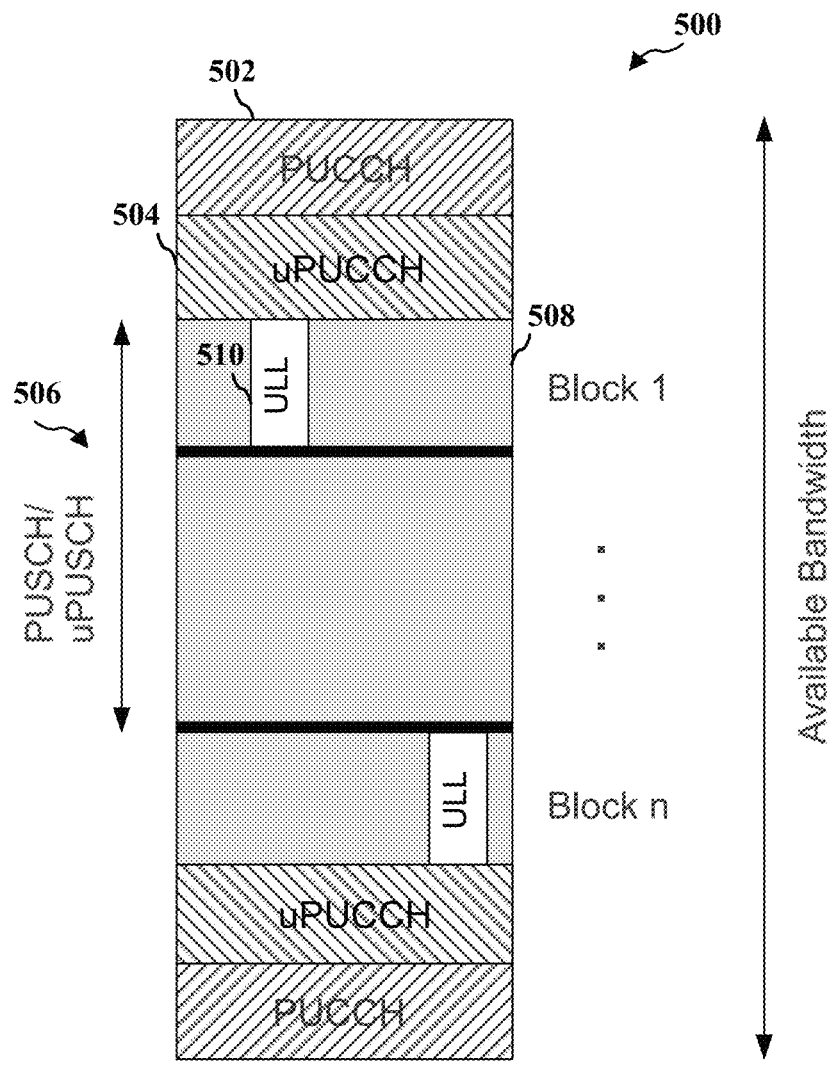
FIG. 5 is a diagram illustrating an example of a system bandwidth in accordance with aspects described herein.

FIG. 5 is a diagram illustrating a non-limiting example of resource allocations over an available bandwidth 500 (e.g., a system bandwidth) or other allocation space in low latency wireless communications. In system bandwidth 500, resources are allocated in FDM such that a given portion of frequency (represented vertically) can be allocated to a given UE over a portion of time (represented horizontally), such as one or more TTIs, where the TTIs may be a one-symbol, two-symbol, slot, etc. duration TTIs. For example, system bandwidth 500, as depicted, may be defined over a subframe, and ULL transmissions 510 may occur in a symbol, over a two-symbol TTI, etc. or other portion of the subframe.

In this example, PUCCH 502 and uPUCCH 504 regions are shown at the ends of the system bandwidth 500, which can be respectively allocated for PUCCH/uPUCCH communications by one or more UEs. The remaining bandwidth 500 may be allocated as a PUSCH and/or uPUSCH 506 region. This PUSCH and/or uPUSCH 506 region may include a number of blocks 508, which may each include a number of physical resource blocks (PRB) corresponding to subcarriers in frequency. ULL transmissions 510 can be scheduled in one or more blocks 508 of PUSCH and/or uPUSCH 506 region, in one example. In an example, the PUSCH and uPUSCH 506 regions can be separate from one another (e.g. frequency division multiplexed) or may overlap. UCI can be transmitted using PUSCH and/or uPUSCH resources (e.g., when the UE has data to transmit, it can be scheduled to also transmit UCI in the uPUSCH resources to maintain the SC-FDM property, but may be scheduled in the PUSCH resources otherwise).

In addition, each downlink channel, such as uPDSCH, received from an access point at a UE can be followed by UL ACK/NAK transmission from the UE. The payload size of the UL ACK/NACK can be from 1 bit (one ACK/NAK for one codeword (CW) of one UE scheduled on one component carrier (CC)) to 10 bits (a UE scheduled over 5 CCs with 2 CW per CC), etc. to even larger sizes in case of enhanced carrier aggregation (32 CCs) or TDD (e.g., in DL-heavy frame structures). Moreover, UEs can be requested to provide CQI feedback, which may include 4 bits for full CQI feedback or 2 bits for differential CQI feedback. Thus, a uPUCCH may be able to handle ACK/NAK feedback for active UEs and also CQI of UEs upon request from an access point. Moreover, different TTI lengths may be envisioned for a uPUCCH, e.g., 2 symbols, 3 symbols, 4 symbols, one slot, etc., given the corresponding low latency technology. The uPUCCH TTI length may depend on the payload, UEs' channel conditions and mobility conditions, etc. For example, a cell-edge UE may use a one-slot uPUCCH to achieve uplink performance metrics, while for a cell-center user, a 2-symbol TTI may be sufficient. Further, uPDSCH and uPUCCH may have different TTI lengths; for example, while uPDSCH is scheduled over 2-symbol TTIs, uPUCCH could be scheduled over 1-slot TTIs (e.g., to improve uplink coverage). Hence, ACK/NAK feedback for multiple uPDSCH can be over one uplink TTI. Similarly, CQI of multiple UEs may be fed back over one uplink TTI.

As such, providing UCI in low latency communication technologies, as described herein, may allow a UE to achieve channel frequency diversity (e.g., through frequency hopping or using a comb structure for resource assignment), to avoid violating the SC-FDM property, to support different UCI payloads and/or channel conditions, to multiplex with other UEs over one UL resource, and/or to reduce DMRS overhead caused by reserving one symbol in the two-symbol TTI for DMRS.

Figure 6:
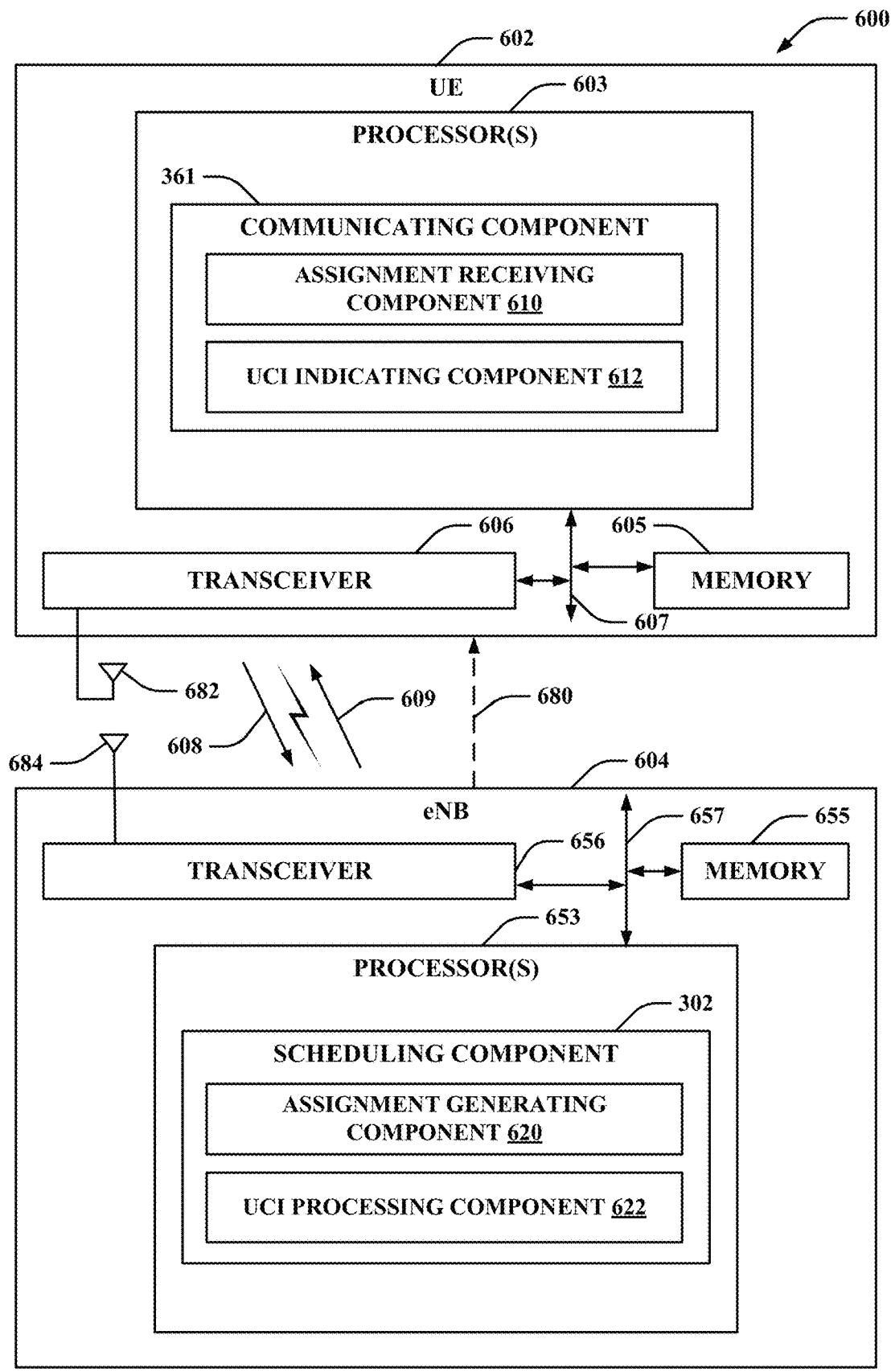
FIG. 6 is a diagram illustrating an example of a system for communicating in a ULL wireless communication technology in accordance with aspects described herein.
Figure 7:
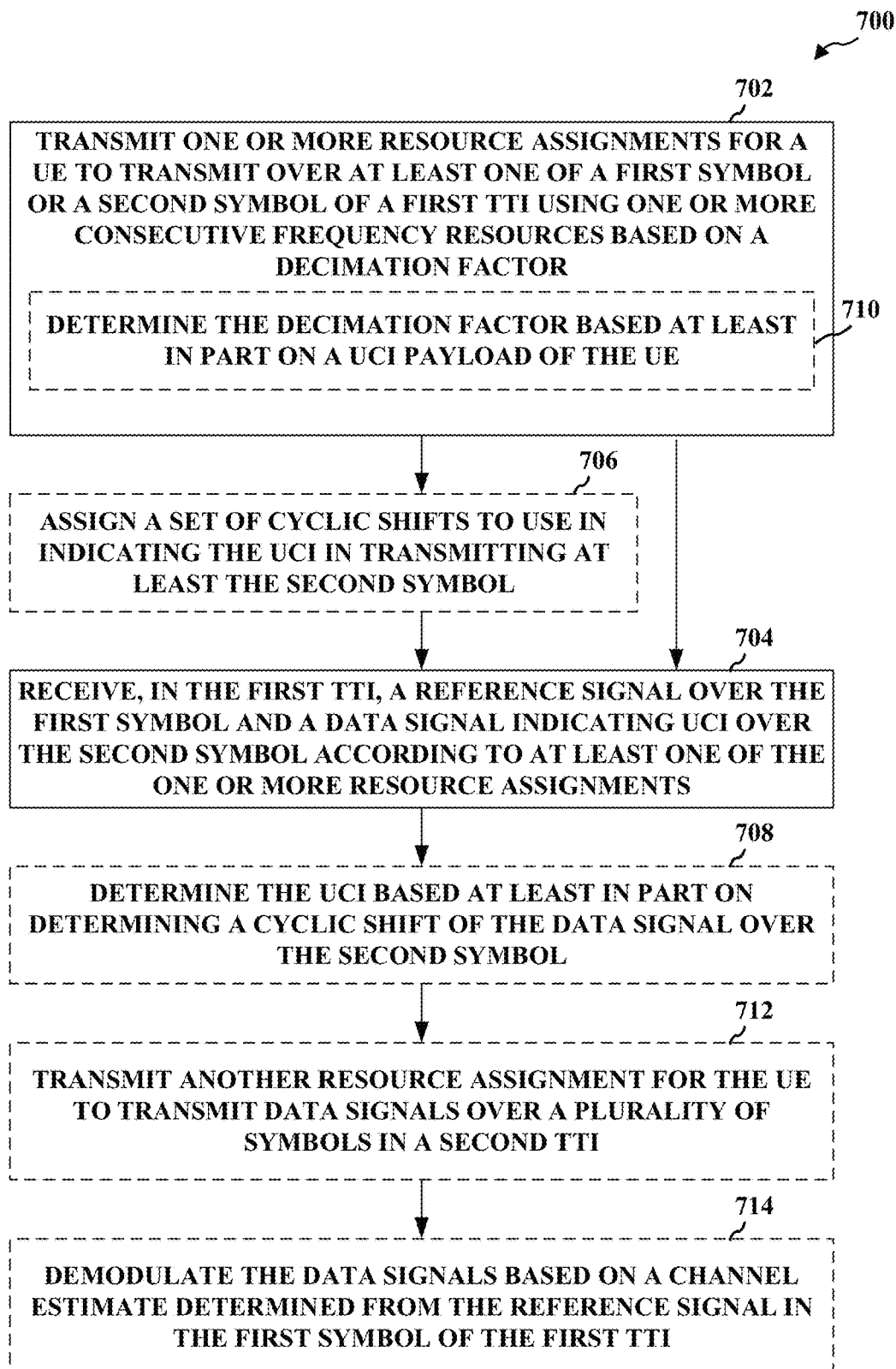
FIG. 7 is a flow chart of an example of a method for receiving ULL wireless communications in accordance with aspects described herein.
Figure 8:
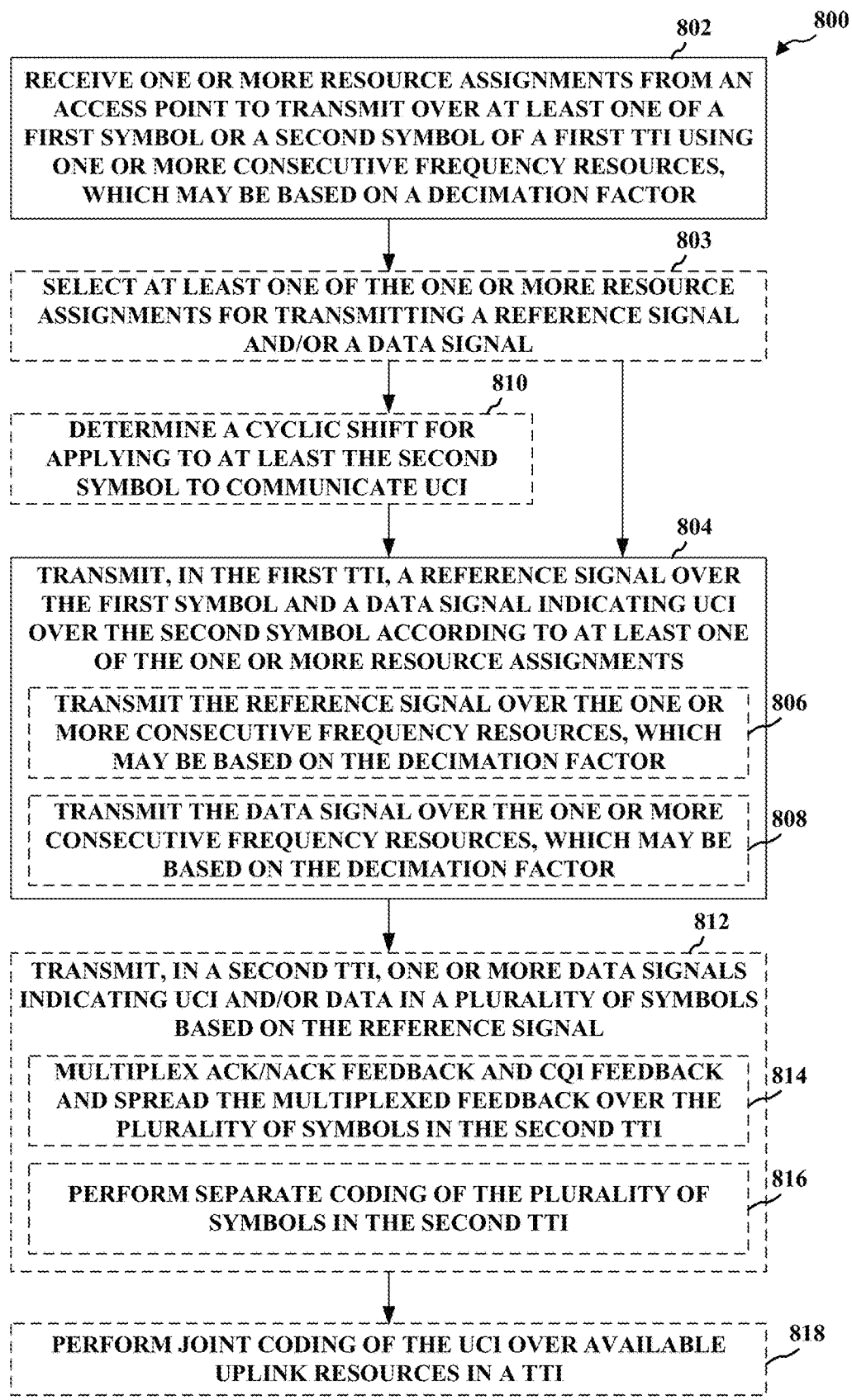
FIG. 8 is a flow chart of an example of a method for transmitting ULL wireless communications in accordance with aspects described herein.

Referring to FIGS. 6-8, aspects are depicted with reference to one or more components and one or more methods that may perform the actions or functions described herein. In an aspect, the term "component" as used herein may be one of the parts that make up a system, may be hardware or software or some combination thereof, and may be divided into other components. Although the operations described below in FIGS. 7-8 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

FIG. 6 illustrates an example of a system 600 for scheduling ULL communications. System 600 includes a UE 602 that communicates with an eNB 604 to access a wireless network, examples of which are described in FIGS. 1-3 (e.g., access points 105, eNB 204, small cell eNB 208, eNB 310, UEs 115, 206, 350, etc.), above. In an aspect, eNB 604 and UE 602 may have established one or more downlink channels over which to communicate via downlink signals 609, which can be transmitted by eNB 604 (e.g., via transceiver 656) and received by UE 602 (e.g., via transceiver 606) for communicating control and/or data messages (e.g., in signaling) from the eNB 604 to the UE 602 over configured communication resources. Moreover, for example, eNB 604 and UE 602 may have established one or more uplink channels over which to communicate via uplink signals 608, which can be transmitted by UE 602 (e.g., via transceiver 606) and received by eNB 604 (e.g., via transceiver 656) for communicating control and/or data messages (e.g., in signaling) from the UE 602 to the eNB 604 over configured communication resources.

As described further herein, for example, eNB 604 may communicate a resource assignment 680 (also referred to as a resource grant) that can indicate resources over which the UE 602 is to communicate (e.g., transmit or receive) certain data with eNB 604, where the resources can correspond to a ULL communication technology, as described. For example, resources related to a ULL communication technology can relate to a ULL timeline (e.g., a timeline having a TTI that is less than a subframe in duration, such as the timelines 400, 402 in FIG. 4), and/or may correspond to an assignment of resources in a system bandwidth (e.g., system bandwidth 500 in FIG. 5). In an example, the resource assignment 680 may correspond to resources for transmitting UCI and/or a related DMRS in one or more symbols of a two-symbol (or more than two-symbol) TTI.

In an aspect, UE 602 may include one or more processors 603 and/or a memory 605 that may be communicatively coupled, e.g., via one or more buses 607, and may operate in conjunction with or otherwise implement a communicating component 361 for communicating using a ULL communication technologies based on one or more resource assignments to transmit UCI. For example, the various operations related to communicating component 361 may be implemented or otherwise executed by one or more processors 603 and, in an aspect, can be executed by a single processor, while in other aspects, different ones of the operations may be executed by a combination of two or more different processors. For example, in an aspect, the one or more processors 603 may include any one or any combination of a modem processor, or a baseband processor, or a digital signal processor, or an application specific integrated circuit (ASIC), or a transmit processor, receive processor, or a transceiver processor associated with transceiver 606. Further, for example, the memory 605 may be a non-transitory computer-readable medium that includes, but is not limited to, random access memory (RAM), read only memory (ROM), programmable ROM (PROM), erasable PROM (EPROM), electrically erasable PROM (EEPROM), a magnetic storage device (e.g., hard disk, floppy disk, magnetic strip), an optical disk (e.g., compact disk (CD), digital versatile disk (DVD)), a smart card, a flash memory device (e.g., card, stick, key drive), a register, a removable disk, and any other suitable medium for storing software and/or computer-readable code or instructions that may be accessed and read by a computer or one or more processors 603. Moreover, memory 605 or computer-readable storage medium may be resident in the one or more processors 603, external to the one or more processors 603, distributed across multiple entities including the one or more processors 603, etc.

In particular, the one or more processors 603 and/or memory 605 may execute actions or operations defined by communicating component 361 or its subcomponents. For instance, the one or more processors 603 and/or memory 605 may execute actions or operations defined by an assignment receiving component 610 for receiving a resource assignment from one or more eNBs. In an aspect, for example, assignment receiving component 610 may include hardware (e.g., one or more processor modules of the one or more processors 603) and/or computer-readable code or instructions stored in memory 605 and executable by at least one of the one or more processors 603 to perform the specially configured resource assigning operations described herein. Further, for instance, the one or more processors 603 and/or memory 605 may execute actions or operations defined by a UCI indicating component 612 for transmitting over resources assigned by the resource assignment such to indicate UCI (e.g., ACK/NACK feedback. CQI feedback, etc.). In an aspect, for example, UCI indicating component 612 may include hardware (e.g., one or more processor modules of the one or more processors 603) and/or computer-readable code or instructions stored in memory 605 and executable by at least one of the one or more processors 603 to perform the specially configured UCI indicating operations described herein.

Similarly, in an aspect, eNB 604 may include one or more processors 653 and/or a memory 655 that may be communicatively coupled, e.g., via one or more buses 657, and may operate in conjunction with or otherwise implement a scheduling component 302 for communicating resource assignments for one or more UEs to transmit UCI in ULL wireless communications. For example, the various functions related to scheduling component 302 may be implemented or otherwise executed by one or more processors 653 and, in an aspect, can be executed by a single processor, while in other aspects, different ones of the functions may be executed by a combination of two or more different processors, as described above. In one example, the one or more processors 653 and/or memory 655 may be configured as described in examples above with respect to the one or more processors 603 and/or memory 605 of UE 602.

In an example, the one or more processors 653 and/or memory 655 may execute actions or operations defined by scheduling component 302 or its subcomponents. For instance, the one or more processors 653 and/or memory 655 may execute actions or operations defined by an assignment generating component 620 for generating a resource assignment for a UE to transmit UCI in one or more symbols of a ULL TTI. In an aspect, for example, assignment generating component 620 may include hardware (e.g., one or more processor modules of the one or more processors 653) and/or computer-readable code or instructions stored in memory 655 and executable by at least one of the one or more processors 653 to perform the specially configured assignment generating operations described herein. Further, for instance, the one or more processors 653 and/or memory 655 may execute actions or operations defined by a UCI processing component 622 for determining UCI transmitted by a UE based at least in part on transmissions over the assigned resources. In an aspect, for example, UCI processing component 622 may include hardware (e.g., one or more processor modules of the one or more processors 653) and/or computer-readable code or instructions stored in memory 655 and executable by at least one of the one or more processors 653 to perform the specially configured UCI processing operations described herein.

In an example, transceivers 606, 656 may be configured to transmit and receive wireless signals through one or more antennas 682, 684 and may generate or process the signals using one or more RF front end components (e.g., power amplifiers, low noise amplifiers, filters, analog-to-digital converters, digital-to-analog converters, etc.), one or more transmitters, one or more receivers, etc. In an aspect, transceivers 606, 656 may be tuned to operate at specified frequencies such that UE 602 and/or eNB 604 can communicate at a certain frequency. In an aspect, the one or more processors 603 may configure transceiver 606 and/or one or more processors 653 may configure transceiver 656 to operate at a specified frequency and power level based on a configuration, a communication protocol, etc. to communicate uplink signals 608 and/or downlink signals 609, respectively, over related uplink or downlink communication channels.

In an aspect, transceivers 606, 656 can operate in multiple bands (e.g., using a multiband-multimode modem, not shown) such to process digital data sent and received using transceivers 606, 656. In an aspect, transceivers 606, 656 can be multiband and be configured to support multiple frequency bands for a specific communications protocol. In an aspect, transceivers 606, 656 can be configured to support multiple operating networks and communications protocols. Thus, for example, transceivers 606, 656 may enable transmission and/or reception of signals based on a specified modem configuration.

FIG. 7 illustrates an example of a method 700 for assigning (e.g., by an eNB) resources for transmitting UCI. FIG. 8 illustrates an example of a method 800 for transmitting (e.g., by an UE) UCI based on resources assigned by an eNB. In methods 700 and 800, blocks indicated as dashed boxes represent optional steps.

In method 700, at Block 702, the eNB can transmit one or more resource assignments for a UE to transmit over at least one of a first symbol or a second symbol of a first TTI using one or more consecutive frequency resources based on a decimation factor. In an aspect, assignment generating component 620, e.g., in conjunction with processor(s) 653, memory 655, and/or transceiver 656, can generate and transmit the one or more resource assignments (e.g., resource assignment 680) for the UE (e.g., UE 602) to transmit over at least one of the first symbol or the second symbol of the first TTI using one or more consecutive frequency resources based on the decimation factor. For example, the resource assignment 680 may indicate the one or more consecutive frequency resources for the first symbol and/or for the second symbol in the one or more resource assignments. In one example, as described further herein, the resource assignment 680 may indicate the one or more consecutive frequency resources for the first symbol based on the decimation factor. The decimation factor may allow the eNB 604 to stagger or interleave resource assignments to the UE 602 and other UEs at least in the first symbol for transmitting the reference signal (e.g., DMRS), and also the second symbol in some examples. For example, the decimation factor may indicate a division of the consecutive frequency resources, and may be used to determine which of the frequency resources to use for transmission by a UE 602. For example, for at least a portion of the frequency resources, the UE 602 can transmit using every nth resource, where n is the decimation factor, as described further herein.

In one example, assignment generating component 620 may generate a first resource assignment for the UE 602 that includes decimated resources for the first symbol and similarly decimated resources for the second symbol, where the resources for the second symbol may relate to a control channel assignment (e.g., a uPUCCH assignment). In another example, assignment generating component 620 may generate a first resource assignment for the UE 602 that may or may not include decimated resources for the first symbol and/or the second symbol (e.g., where resources for UE 602 are not interleaved in frequency with resources for other UEs, or may otherwise include substantially all bandwidth (e.g., of a system band)). In this example, assignment generating component 620 can configure the UE 602 with at least two or more uPUCCH resources, in this regard, where some resources are decimated, or have a comb structure and operation, and some are not decimated, or do not have the comb structure or operating. Thus, these different uPUCCH resource assignments can correspondingly have different capacity (e.g., due to at least one of the comb structure/ operation or lack of comb structure/operation in the second symbol with control data, the number of corresponding resource blocks, etc.) and/or different performance (e.g., due to comb structured DMRS or non-comb structured DMRS based channel estimation in the first symbol). In one example, assignment generating component 620 may also indicate which resource assignment is assigned to the UE 602, where a corresponding indication may include an information field in downlink control information transmitted to the UE 602 (e.g., in uPDCCH resources assigned to the UE 602).

At Block 802, the UE can receive one or more resource assignments from an access point to transmit over at least one of a first symbol or a second symbol of a first TTI using one or more consecutive frequency resources, which may be based on a decimation factor. In an aspect, assignment receiving component 610, e.g., in conjunction with processor(s) 603, memory 605, and/or transceiver 606, can receive the one or more resource assignments (e.g., resource assignment 680) from the access point (e.g., eNB 604) to transmit over at least one of the first symbol or the second symbol of the first TTI using one or more consecutive frequency resources, which may be based on the decimation factor. As described, the one or more resource assignments may indicate the one or more consecutive frequency resources for at least the reference signal transmission over the first symbol, and in some examples may also indicate the one or more consecutive frequency resources (or other consecutive frequency resources), which may be based on a decimation factor for the data signal transmission over the second symbol. In other examples, the frequency resources in at least one of the one or more resource assignments may not be decimated in frequency, as described.

In one example, optionally at Block 803, the UE can select at least one of the one or more resource assignments for transmitting a reference signal and/or a data signal. In an aspect, UCI indicating component 612, e.g., in conjunction with processor(s) 603, memory 605, and/or transceiver 606, can select at least one of the one or more resource assignments for transmitting the reference signal and/or the data signal. As described, the where multiple resource assignments are received, the resource assignments may be based on decimated or non-decimated frequency resources in one or more symbols, and may thus provide different capacities or performances based on frequency resources associated with the respective assignment. For example, resource assignments with non-decimated (e.g., non-comb structured) resources may provide additional capacity and/or performance, but may do so at the cost of not allowing other UEs to use the resources.

Thus, for example, UCI indicating component 612 may select a resource assignment with decimated frequency resources (e.g., comb structure) where a payload size for control data is below a threshold size, or may select the resource assignment with non-decimated frequency resources (e.g., non-comb structure) otherwise. In another example, UCI indicating component 612 may select the resource assignment from the one or more resource assignments based on a RRC configuration received from the eNB 604, an indicated or determined need to multiplex communications with other UEs, etc. In another example, UCI indicating component 612 may select the resource assignment of the one or more resource assignments to utilize based on an indication from the eNB 604, where the indication can be received in downlink control information received over uPDCCH resources, an a RRC configuration, etc.

In any case, at Block 804, the UE may transmit, in the first TTI, a reference signal over the first symbol and a data signal indicating UCI over the second symbol according to at least one of the one or more resource assignments. In an aspect, UCI indicating component 612, e.g., in conjunction with processor(s) 603, memory 605, and/or transceiver 606, can transmit, in the first TTI, a reference signal over the first symbol and a data signal indicating UCI over the second symbol according to the at least one of the one or more resource assignments. As described, for example, UCI indicating component 612 can select the at least one of the one or more resource assignments based on one or more considerations or an indication from the eNB 604, as described above, and may transmit the reference signal and/or data signal over the resources in the selected resource assignment.

In an example, in transmitting, the UE may optionally, at Block 806, transmit the reference signal over the one or more consecutive frequency resources, which may be based on the decimation factor, and/or, at Block 808, transmit the data signal over the one or more consecutive frequency resources, which may be based on the decimation factor. In an aspect, UCI indicating component 612, e.g., in conjunction with processor(s) 603, memory 605, and/or transceiver 606, can transmit the reference signal (e.g., DMRS) over the one or more consecutive frequency resources, which may be based on the decimation factor (e.g., where the resource assignment corresponds to resources decimated in frequency), and/or can transmit the data signal to indicate UCI over the one or more consecutive frequency resources, which may be based on the decimation factor (e.g., where the resource assignment corresponds to resources decimated in frequency), as described further herein.

In either case, at Block 704, the eNB can receive, in the first TTI, a reference signal over the first symbol and a data signal indicating UCI over the second symbol according to at least one of the one or more resource assignments. In an aspect, UCI processing component 622, e.g., in conjunction with processor(s) 653, memory 655, and/or transceiver 656, can receive, in the first TTI, the reference signal over the first symbol and the data signal indicating UCI over the second symbol according to at least one of the one or more resource assignments. As described for example, UCI processing component 622 can receive at least the reference signal (e.g., DMRS) over the one or more consecutive frequency resources, which may be based on the decimation factor (e.g., where the resource assignment corresponds to resources decimated in frequency), and/or also the data signal over one or more consecutive frequency resources, which may be based on a decimation factor in the second symbol (e.g., where resource assignment corresponds to resources decimated in frequency), in some examples.

Figure 9:
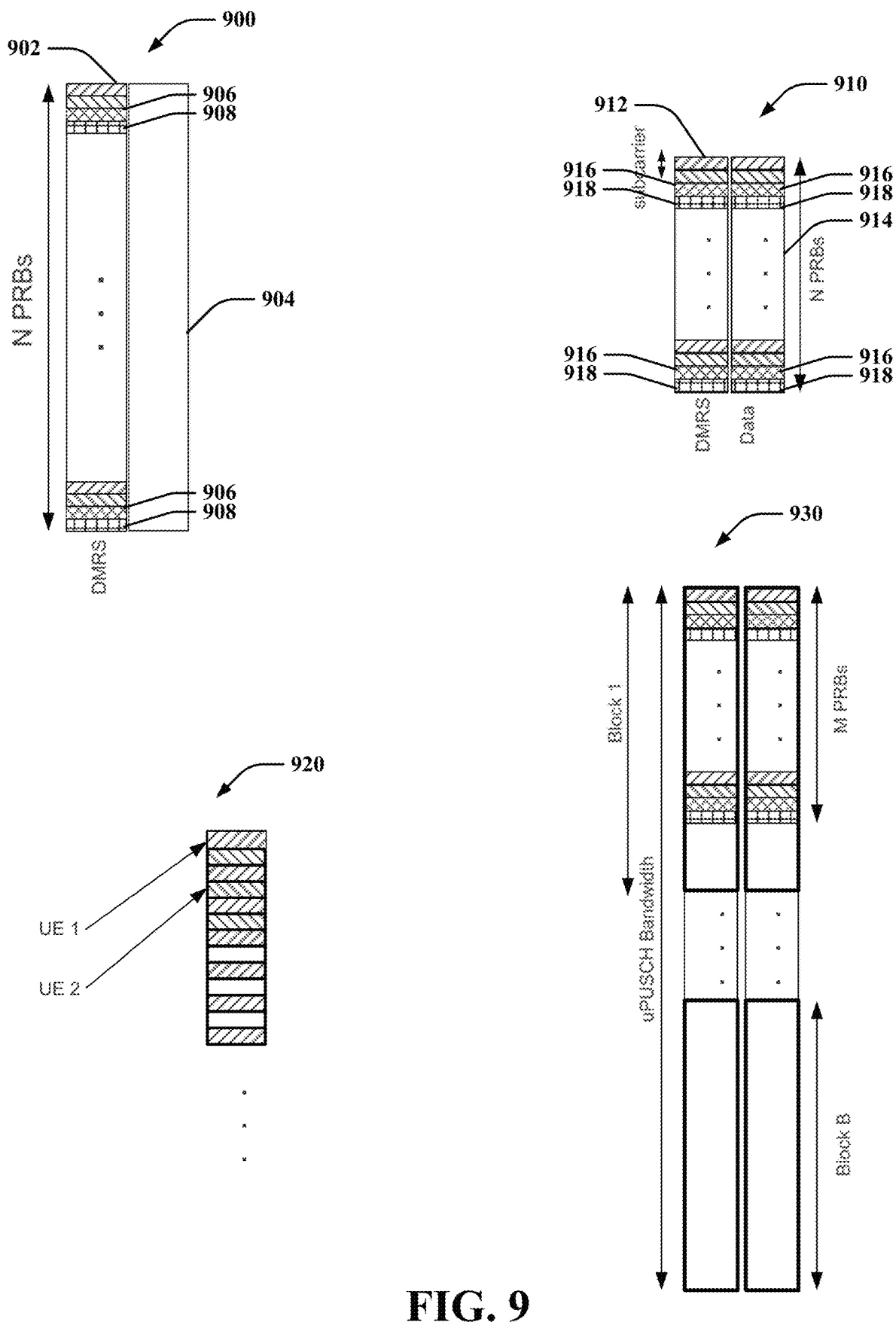
FIG. 9 illustrates diagrams of examples of allocation spaces for allocating resources in ULL communications in accordance with aspects described herein.

A specific example of resource assignments of one or more consecutive frequency resources, which may be based on the decimation factor, are shown in FIG. 9. For example, allocation space 900 may include all or a portion of a system bandwidth over two symbols 902, 904. For example, symbol 902 may include a resources 906 assigned to one UE (e.g., UE 602), resources 908 assigned to another UE, and other resources assigned to other UEs in a comb structure, where each resource in resources 906 and 908 and the other individual resources (e.g., subcarriers, tones, etc.) can be referred to as comb teeth. Each of resources 906 and resources 908 include consecutive frequency resources in the symbol 902 according to a decimation factor (e.g., a factor of 4, or every 4th frequency resource or comb tooth, as shown), where the resources 906 and 908 are offset from one another to provide orthogonality. The resources 906 and/or 908 may span the entire allocation space 900 and/or system bandwidth and/or one or more other blocks or portions thereof. In this example, assignment receiving 610 can receive a resource assignment 680 indicating resources 906 and/or a related comb index (e.g., an offset of one or more resources in the symbol 902), a decimation factor, etc., and can transmit DMRS over the first symbol 902 at one or more of the consecutive frequency resources 906 assigned to the UE based on the comb index, decimation factor, etc. This allows the UEs to transmit orthogonal DMRS, as described herein.

In addition, in this example, assignment generating component 620 may assign a physical resource block (PRB) (e.g., 12 consecutive subcarriers) to the UE 602 (e.g., and/or additional PRBs to other UEs) for transmitting UCI in the symbol 904 in the resource assignment 680. In this example, assignment receiving component 610 can receive the resource assignment 680 and accordingly transmit UCI over the PRB in symbol 904. In an example, assignment generating component 620 may assign substantially all PRBs in a system bandwidth to the UE 602 for transmitting UCI in the symbol 904. For example, assignment generating component 620 may assign symbol 904 to UE 602 where there is only one UE scheduled to transmit UCI in the symbol, based on a payload size of the UCI achieving a threshold (e.g., in enhanced carrier aggregation where the UE 602 reports UCI for multiple component carriers), etc. In either case, UCI indicating component 612 can transmit the UCI us SC-FDM over the frequency resources of the symbol 904.

In another example, assignment generating component 620 may assign, in the resource assignment 680, cyclic shifts to the UE 602 to be used in transmitting over one or more PRBs of the symbol 904, as described further herein. In this example, assignment receiving component 610 can receive the cyclic shifts, and UCI indicating component 612 may select a cyclic shift for transmitting UCI in symbol 904, where the cyclic shift may indicate UCI when considered with a number of cyclic shift options for the UE 602 (e.g., and/or where the cyclic shift(s) may be assigned to the UE 602 in the resource assignment generated by assignment generating component 620).

For example, given N number of blocks in the allocation space, 12N cyclic shifts can be available for the data symbol 904, and thus for UUEs, each UE can use one of up to 12N/U=k cyclic shifts (CS) to indicate UCI. The selection of 1 out of k CSs in each group can convey $\log\_2(k)$ bits for each UE. The selected CS can be used to modulate the data symbol 904 to indicate the bits for UCI. For example, with QPSK modulation, $2+\log\_2(k)$ bits can be transmitted to each UE.

In this example, at Block 706, the eNB may optionally assign a set of cyclic shifts to use in indicating the UCI in transmitting at least the second symbol. In an aspect, assignment generating component 620, e.g., in conjunction with processor(s) 653, memory 655, and/or transceiver 656, can assign, to the UE 602, the set of cyclic shifts to use in indicating the UCI in transmitting at least the second symbol. For example, assignment generating component 620 may indicate the cyclic shifts as part of the resource assignment 680 or a separate communication/configuration for the UE 602. For example, assignment generating component 620 may assign different cyclic shifts to different UEs to allow the UEs to multiplex UCI in the second symbol.

Additionally, in this example, at Block 810, the UE can optionally determine a cyclic shift for applying to at least the second symbol to communicate UCI. In an aspect, UCI indicating component 612, e.g., in conjunction with processor(s) 603, memory 605, and/or transceiver 606, can determine the cyclic shift for applying to at least the second symbol to communicate the UCI. For example, assignment receiving component 610 can receive a set of cyclic shifts assigned to the UE 602 (e.g., from eNB 604 and/or a received configuration). As described, UCI indicating component 612 can select a cyclic shift to indicate the UCI (e.g., up to log_2(k) bits for k possible cyclic shifts in the set). Accordingly, for example, UCI indicating component 612 can transmit the data signal over the second symbol (e.g., at Block 804) based on applying the cyclic shift such to indicate the UCI. Similarly, in this example, the UCI processing component 622 can receive the data signal (e.g., at Block 704) and determine the cyclic shift, such to process the bits of the UCI.

In this regard, for example, the eNB may optionally, at Block 708, determine the UCI based at least in part on determining a cyclic shift of the data signal over the second symbol. As described in an aspect, UCI processing component 622, e.g., in conjunction with processor(s) 653, memory 655, and/or transceiver 656, can determine the UCI based at least in part on determining a cyclic shift of the data signal over the second symbol. In an example, UCI processing component 622 can determine the set of cyclic shifts provided to the UE 602 and bits or UCI values associated with each of the cyclic shifts, and can accordingly determine the UCI based on the cyclic shift. As described, in an example, where 4 cyclic shifts are available for a UE 602, UCI indicating component 612 may indicate 2 bits (e.g., one or more ACK/NACKs, a differential CQI, etc.), and UCI processing component 622 can accordingly process the two bits to determine the UCI.

In an example, UCI indicating component 612 may also transmit the reference signal in the first symbol (e.g., symbol 902) using one or more remaining cyclic shifts not assigned to any UE by the eNB 604 and/or using one or more computer generated sequences (CGS) determined to have low (or lowest) peak-to-average power ratio (PAPR). In one example, assignment generating component 620 may indicate any remaining cyclic shifts and/or CGSs to the UE 602 (e.g., in the resource assignment 680, in other dedicated signaling, such as RRC signaling, etc.), and UCI indicating component 612 can accordingly determine and apply one of the cyclic shifts and/or CGSs to the reference signal for transmitting the first symbol. For example, where assignment receiving 610 receives a resource assignment 680 or other configuration indicating a comb index and/or a number, k, of subcarriers, and UCI indicating component 612 transmits over the k subcarriers based on the comb index, a determined optimal sequence of QPSK symbols of length k can be obtained to minimize the PAPR over possible sequences of length k. For example, the optimal sequences and corresponding values of k and/or comb index can be configured in the UE 602 or otherwise received in a configuration from eNB 604 or other network components.

Another specific example of the resource assignment of one or more consecutive frequency resources according to the decimation factor is shown in FIG. 9 at allocation space 910. Allocation space 910, for example, may include a portion of a system bandwidth over two symbols 912, 914. For example, symbol 912 may include resource 916 for assigning to one UE (e.g., UE 602) and resources 918 for assigning to another UE. Each of resources 916 and resources 918 can include consecutive frequency resources in both of the symbols 912 and 914 according to a decimation factor (e.g., a factor of 4, or every 4th frequency resource or comb tooth, as shown), where the resources 916 and 918 are offset from one another to provide orthogonality. The resources 916 and/or 918 may span the entire allocation space 910 and/or system bandwidth and/or one or more other blocks or portions thereof. In this example, assignment receiving component 610 can receive a resource assignment 680 indicating resources 916 over symbols 912 and 914, and can transmit DMRS over the first symbol 912 at one or more of the consecutive frequency resources 906 assigned to the UE over the first symbol 912, and transmit UCI over the second symbol 914 at one or more of the consecutive frequency resources 906 assigned to the UE over the second symbol 914. This allows the UEs to transmit orthogonal DMRS and UCI, as described herein. Using additional resources in the data symbol 914 to transmit UCI in this regard can allow for communicating larger UCI payload sizes, and also allows the UEs to transmit in an interleaved frequency division multiple access (IFDMA) fashion over the symbol 914, such to preserve the SC-FDM property. Allocation space 920 shows an example where both symbols (or one symbol in a one symbol TTI, and/or multiple symbols in a multiple symbol TTI) include resources allocated according to a decimation factor, though not all resources need be allocated (e.g., 3 resources are allocated to UE 2). In addition, allocation space 930 shows an example similar to allocation space 910 where resources are assigned over one block (or partially over one block) of multiple blocks in the system bandwidth. Moreover, in an example, the decimation factors among symbols 912 and 914 can be different, and the resources in a given symbol 912 or 914 can be assigned to different UEs or sets of UEs. For example, symbol 912 may include resources assigned to allow 2 different UEs to transmit DRMS, while symbol 914 may include resources assigned to allow 4 different UEs (which may or may not include the 2 UEs transmitting DMRS) to transmit control data.

In addition, in one or more of the above examples, UCI indicating component 612 can transmit the DMRS in the first symbol 912 using a cyclic shift or CGS and other UEs can transmit DMRS in the first symbol 912 using different cyclic shifts or CGS to provide orthogonality. For example, assignment generating component 620 may assign the cyclic shifts and/or CGSs to the UEs (e.g., UE 602) for DMRS transmission in the first symbol 912. In another example, assignment generating component 620 may semi-statically assign the resources 916, 918, etc. to the one or more UEs, and may do so based on a determined, received, or otherwise predicted UCI payload for the one or more UEs (e.g., based on whether ACK/NACK and/or CQI are expected). In an example, assignment generating component 620 may assign the resources 916 to UE 602 in the resource assignment 680 as part of a downlink grant. In this example, assignment receiving component 610 may receive an indication of the resources 916 in the downlink resource grant, and may utilize the resources 916 to transmit DMRS and/or UCI on the appropriate symbol 912 or 914. In yet another example, assignment receiving component 610 may determine the resources 916 implicitly (e.g., based on a control channel element (CCE) assigned by the eNB 604 via assignment generating component 620, semi-statically, such as based on an identifier of the UE 602, etc.).

In another example, in transmitting the resource assignment at Block 702, the eNB may also transmit other resource assignments to other UEs (e.g., to assign resources 908, 918 and/or other resources). For example, assignment generating component 620 may generate resource assignments for various UEs that can vary in size (e.g., depending on a payload of the UCI for the UE). For example, the eNB may optionally, at Block 710, determine the decimation factor based at least in part on a UCI payload of the UE. In an aspect, assignment generating component 620, e.g., in conjunction with processor(s) 653, memory 655, and/or transceiver 656, can determine the decimation factor based at least in part on the UCI payload of the UE. In an aspect, the UE 602 may indicate an expected UCI payload and/or the eNB 604 may otherwise receive, determine, or predict the UCI payload, or otherwise determine to assign more resources to the UE 602 than to another UE. In an example, assignment generating component 620 can select a smaller decimation factor for a UE 602 to allow increased payload for UCI transmissions. Similarly, assignment generating component 620 can select a larger decimation factor to support additional UEs, to support additional CWs per UE, etc.

In one example, assignment generating component 620 may determine to assign resources to UEs using a tree based interlace allocation scheme. For example, assignment generating component 620 may divide the resources into various levels with associated decimation factors. For example, the resources may be divided into two levels of a similar number of resources at decimation level two. One or more of the two levels can be divided into two levels of a similar number of resources at a decimation level four, and so on. Thus, for example, assignment generating component 620 may assign a UE a decimation level 2 (e.g., every other frequency resource) and assign two other UEs decimation level 4 (e.g., every fourth frequency resource) such that the resources are assigned as follows:

|  |
| --- |
| UE1 |
| UE2 |
| UE1 |
| UE3 |
| UE1 |
| UE2 |
| UE1 |
| UE3 |
| ... | where UE1 is assigned resources based on a decimation level 2, and UE2 and UE3 are assigned resources based on a decimation level 4 (which are comprised of the remaining decimation level 2 resources not assigned to UE1). In an example, assignment generating component 620 can further divide each level into additional levels (e.g., decimation level 8, 16, etc.) to allocate resources to additional UEs, etc.

In some example, some frequency resources may not end up being assigned to any UE by assignment generating component 620. In this example, assignment generating component 620 may assign at least a portion of the unused frequency resources in the DMRS and/or data symbol to one or more UEs to allow transmission of additional data.

In an aspect, in transmitting in the first TTI at Block 804, the UE may transmit the UCI in the second symbol as one or more of ACK/NACK feedback, CQI feedback, and/or data (e.g., ACK/NACK only, CQI only, ACK/NACK+CQI, ACK/NACK+Data, CQI+Data, or ACK/NACK+CQI+Data). In an example, where UCI indicating component 612 transmits ACK/NACK feedback, it may utilize uPUCCH resources. Where UCI indicating component 612 transmits CQI and/or ACK/NACK+CQI, it may utilize the fraction of uPUSCH resources as described above to transmit the UCI in the second symbol in an IFDMA fashion. In an example, as UCI indicating component 612 may not always need to transmit CQI, the sub-block (or partial block) of uPUSCH need not always be reserved for the UE to transmit the CQI. In one example, assignment generating component 620 can indicate in the downlink resource grant whether the UE 602 is to transmit CQI (e.g., whether the sub-block is present in the uPUSCH). In one example, where the sub-block is present, uPUSCH can be transmitted in one or more blocks in a lower part of the system bandwidth (e.g., as in allocation space 930 of FIG. 9). Where UCI indicating component 612 transmits UCI+Data, it may multiplex the UCI and data over uPUSCH resources.

Using each first symbol of each TTI for DMRS transmission may introduce significant overhead (e.g., 50%) for transmitting DMRS. To reduce the overhead, the DMRS may be shared across multiple consecutive TTIs, in one example. In this example, DMRSs of different UEs scheduled over multiple TTIs can be distinguished via using different cyclic shifts and/or resources (e.g., comb teeth). A pattern for transmitting reference symbols and data can be configured. For example, consecutive symbols in a slot can be data (D), reference signal (R), D, D, D, R, D. In another example, possible patterns may include (D, D), (R, D), (D, R), and (R, D, D) for the symbols, and assignment generating component 620 may signal to the UE 602 which pattern to use. In another example, the pattern may be based on a downlink TTI location. Moreover, for example, a default UL pattern for two-symbol TTI can be defined.

In this regard, at Block 712, the eNB may transmit another resource assignment for the UE to transmit data signals over a plurality of symbols in a second TTI. In an aspect, assignment generating component 620, e.g., in conjunction with processor(s) 653, memory 655, and/or transceiver 656, can transmit another resource assignment for the UE 602 to transmit data signals over the plurality of symbols in the second TTI. Thus, for example, assignment generating component 620 assigns resources for (R, D) in the first TTI, and (D, D) in the second TTI. This allows the UE to transmit additional UCI and/or data in the second TTI without having to also transmit DMRS over either of the symbols.

In this example, the UE 602 can receive the resource assignment and may optionally, at Block 812, transmit, in a second TTI, one or more data signals indicating UCI and/or data in a plurality of the symbols based on the reference signal. In an aspect, UCI indicating component 612, e.g., in conjunction with processor(s) 603, memory 605, and/or transceiver 606, can transmit, in the second TTI, one or more data signals indicating UCI and/or data in the plurality of the symbols based on the reference signal. For example, the reference signal is the reference signal transmitted in the first TTI.

Accordingly, for example, the eNB may optionally, at Block 714, demodulate the data signals (e.g., as received in the second TTI) based on a channel estimate determined from the reference signal in the first symbol of the first TTI. In an aspect, UCI processing component 622, e.g., in conjunction with processor(s) 653, memory 655, and/or transceiver 656, can demodulate the data signals (e.g., as received in the second TTI) based on a channel estimate determined from the reference signal in the first symbol of the first TTI. This facilitates utilizing the reference signal for multiple TTIs, which lowers the DMRS overhead, as described.

Figure 10:
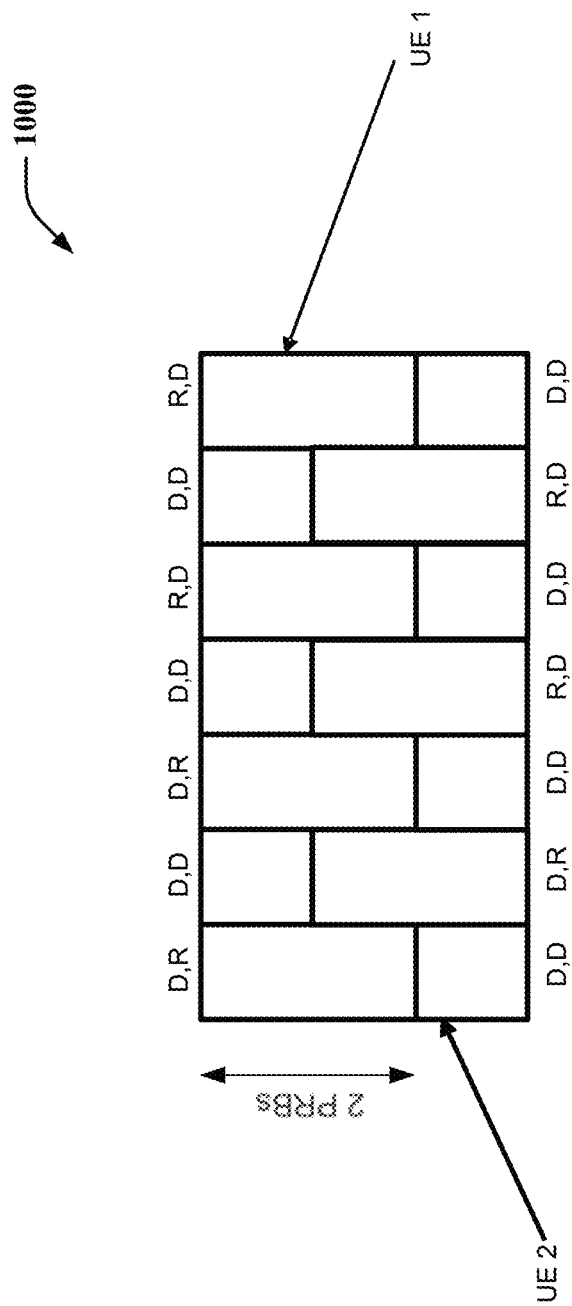
FIG. 10 illustrates a diagram of an example of an allocation space for data and reference signals in ULL communications in accordance with aspects described herein.

In another example, assignment generating component 620 can extend TTIs over which reference signals and data signals are transmitted to include twice as many resources as TTIs over which only data signals are transmitted. This is shown in FIG. 10, which illustrates an example bandwidth 1000 with 2 PRBs allocated for each TTI having a reference signal, and one PRB for each TTI having only data symbols. This can facilitate the same or similar payload for a UE (UE1) transmitting UCI in each TTI. In addition, assignment generating component 620 can assign another UE (UE2) resources based on the PRB allocations for UE1, where the UE2 can be assigned to transmit only data symbols in a TTI where UE1 is assigned to transmit reference and data symbols, and vice versa. In either case, assignment generating component 620 can indicate the PRB assignment to the UEs in the downlink resource grant, as described. Moreover, in an example, assignment generating component 620 can assign resources for a (D, R) or (R, D) TTI for transmitting either ACK/NACK or CQI, and can assign resources for a (D, D) TTI for transmitting both ACK/NACK and CQI.

In another example, UCI can be multiplexed and/or joint/separately coded. For example, in transmitting in the second TTI, the UE may optionally, at Block 814, multiplex ACK/NACK feedback and CQI feedback and spread the multiplexed feedback over the plurality of symbols in the second TTI. In an aspect, UCI indicating component 612, e.g., in conjunction with processor(s) 603, memory 605, and/or transceiver 606, can multiplex ACK/NACK feedback and CQI feedback and spread (e.g., DFT spread) the multiplexed feedback over the plurality of symbols in the second TTI.

In another example, in transmitting in the second TTI, the UE may optionally, at Block 816, perform separate coding of the plurality of symbols in the second TTI. In an aspect, UCI indicating component 612, e.g., in conjunction with processor(s) 603, memory 605, and/or transceiver 606, can perform separate coding of the plurality of symbols in the second TTI. For example, UCI indicating component 612 can perform separate coding of ACK/NACK feedback and CQI feedback to produce two sets of coded symbols, which may be transmitted in one or more data symbols (e.g., using different resource elements in one or more data symbols— such as in a data symbol in a (R, D) or (D, R) TTI, using different data symbols—such as in a (D, D) TTI, etc.). In other examples, UCI indicating component 612 may optionally puncture resources, rate match around resources, etc. in transmitting over the second TTI.

In another example, the UE may optionally, at Block 818, perform joint coding of the UCI over available uplink resources in a TTI. In an aspect, UCI indicating component 612, e.g., in conjunction with processor(s) 603, memory 605, and/or transceiver 606, can perform joint coding of the UCI (e.g., ACK/NACK feedback and CQI feedback) over available uplink resources of substantially any TTI (e.g., resources in both symbols of a two-symbol TTI).

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for communicating uplink control information (UCI), comprising:
receiving one or more resource assignments from an access point to transmit over a first symbol and at least one second symbol that comprise a first transmission time interval (TTI), wherein a resource assignment of the one or more resource assignments includes, at least for the at least one second symbol, an indication of one or more consecutive frequency resources divided in a bandwidth of an uplink channel based on a factor;
transmitting, in the first TTI and according to the one or more resource assignments, a reference signal over the first symbol; and
transmitting, in the first TTI, according to the one or more resource assignments, and only in multiple frequency resources that are interleaved in frequency based on the factor, a data signal indicating UCI over the at least one second symbol.

2. The method of claim 1, further comprising determining a cyclic shift for applying to the at least one second symbol in the first TTI to communicate the UCI for downlink communications received from the access point.

3. The method of claim 2, further comprising transmitting, in the first TTI, a demodulation reference signal using a different cyclic shift or a computer generated sequence assigned by the access point.

4. The method of claim 3, further comprising obtaining a sequence of quadrature phase shift keying (QPSK) symbols for the computer generated sequence based on at least one of a comb index or a number of the one or more consecutive frequency resources indicated in the resource assignment, wherein the sequence of QPSK symbols is determined to have a lowest peak-to-average power ratio than other sequences of the QPSK symbols.

5. The method of claim 1, wherein the reference signal is a demodulation reference signal to facilitate demodulating data transmitted in the at least one second symbol.

6. The method of claim 1, wherein the resource assignment includes, for the at least one second symbol, an indication of a physical resource block for indicating the UCI in the data signal.

7. The method of claim 1, wherein the resource assignment includes, for the first symbol, a second indication of one or more consecutive frequency resources in the system bandwidth based on the factor, wherein transmitting the reference signal comprises transmitting a demodulation reference signal over the one or more consecutive frequency resources of the second indication in the first symbol.

8. The method of claim 1, wherein the resource assignment indicates a comb index indicating a starting frequency resource of the multiple frequency resources, and further comprising determining the multiple frequency resources based at least in part on the comb index and the factor.

9. The method of claim 1, wherein the resource assignment is received in a downlink resource grant from the access point or implicitly determined.

10. The method of claim 1, wherein the resource assignment is within one or more frequencies assigned for uplink shared channel transmissions.

11. The method of claim 1, wherein the one or more consecutive frequency resources spans a partial block of the system bandwidth or the entire system bandwidth.

12. The method of claim 1, wherein transmitting the first symbol and the at least one second symbol in the first TTI is based on interleaved frequency division multiple access.

13. The method of claim 1, wherein the UCI includes an acknowledgement (ACK)/negative ACK (HACK) of a downlink channel from the access point or a channel quality indicator corresponding to a downlink channel received from the access point.

14. The method of claim 1, wherein a second resource assignment of the one or more resource assignments includes, for the at least one second symbol, an indication of a physical resource block for indicating the UCI in the data signal.

15. The method of claim 14, further comprising selecting one of the resource assignment or the second resource assignment for transmitting the data signal over the at least one second symbol.

16. The method of claim 15, wherein selecting the one of the resource assignment or the second resource assignment is based at least in part on determining a payload size of the UCI.

17. The method of claim 15, wherein selecting the one of the resource assignment or the second resource assignment is based at least in part on determining to multiplex control data with other UEs.

18. The method of claim 15, wherein selecting the one of the resource assignment or the second resource assignment is based at least in part on a radio resource control (RRC) configuration.

19. The method of claim 15, wherein selecting the one of the resource assignment or the second resource assignment is based at least in part on determining an assignment from downlink control information from the access point.

20. The method of claim 1, further comprising transmitting, in a second TTI, data in a plurality of symbols based at least in part on the reference signal transmitted in the first symbol of the first TTI.

21. The method of claim 20, further comprising determining to transmit data in the plurality of symbols based at least in part on the reference signal, wherein the determining is based at least in part on a pattern defined in a received downlink resource grant.

22. The method of claim 20, further comprising alternating, for each of two or more TTIs, between using the first symbol for transmitting the reference signal and the at least one second symbol for transmitting data, and using the first symbol and the at least one second symbol for transmitting data.

23. The method of claim 20, further comprising transmitting one of acknowledgement (ACK)/negative ACK (NACK) feedback or channel quality indicator (CQI) feedback in the at least one second symbol of the first TTI, and transmitting ACK/NACK feedback and CQI feedback in one or more of the plurality of symbols in the second TTI.

24. The method of claim 23, further comprising:
multiplexing the ACK/NACK feedback and CQI feedback; and
performing discrete Fourier transform (DFT) spreading of the multiplexed feedback over the one or more of the plurality of symbols in the second TTI.

25. The method of claim 23, further comprising performing separate coding of the plurality of symbols in the second TTI.

26. The method of claim 1, further comprising performing joint coding of the UCI over available uplink resources in the first TTI.

27. A method for communicating uplink control information (UCI), comprising:
transmitting one or more resource assignments for a user equipment to transmit over a first symbol and at least one second symbol that comprise a first transmission time interval (TTI), wherein at least one resource assignment of the one or more resource assignments includes, at least for the at least one second symbol, an indication of one or more consecutive frequency resources divided in a bandwidth of an uplink channel based on a factor; and
receiving, in the first TTI and according to the one or more resource assignments, a reference signal over the first symbol; and
receiving, in the first TTI, according to the one or more resource assignments, and only in multiple frequency resources that are interleaved in frequency based on the factor, a data signal indicating UCI over the at least one second symbol.

28. The method of claim 27, wherein the at least one resource assignment includes, for the first symbol, a second indication of one or more consecutive frequency resources in the system bandwidth based on the factor,
wherein a second resource assignment of the one or more resource assignments includes, for the at least one second symbol, an indication of a physical resource block for indicating the UCI in the data signal; and
further comprising indicating a selection of one of the at least one resource assignment or the second resource assignment to the UE for transmitting the data signal over the at least one second symbol.

29. An apparatus for wireless communications, comprising:
a transceiver for communicating one or more wireless signals via one or more antennas;
a memory configured to store instructions; and
one or more processors communicatively coupled with the transceiver and the memory, wherein the one or more processors are configured to:
receive one or more resource assignments from an access point to transmit over a first symbol and at least one second symbol that comprise a first transmission time interval (TTI), wherein a resource assignment of the one or more resource assignments includes, at least for the at least one second symbol, an indication of one or more consecutive frequency resources divided in a bandwidth of an uplink channel based on a factor; and transmit, in the first TTI and according to the one or more resource assignments, a reference signal over the first symbol; and transmit, in the first TTI, according to the one or more resource assignments, and only in multiple frequency resources that are interleaved in frequency based on the factor, a data signal indicating UCI over the at least one second symbol.

30. An apparatus for wireless communications, comprising:
 a transceiver for communicating one or more wireless signals via one or more antennas;
 a memory configured to store instructions; and
 one or more processors communicatively coupled with the transceiver and the memory, wherein the one or more processors are configured to:
  transmit one or more resource assignments for a user equipment to transmit over a first symbol and at least one second symbol that comprise a first transmission time interval (TTI), wherein at least one resource assignment of the one or more resource assignments includes, at least for the at least one second symbol, an indication of one or more consecutive frequency resources divided in a bandwidth of an uplink channel based on a factor; and receive, in the first TTI and according to the one or more resource assignments, a reference signal over the first symbol; and receive, in the first TTI, according to the one or more resource assignments, and only in multiple frequency resources that are interleaved in frequency based on the factor, a data signal indicating UCI over the at least one second symbol.

* * * * *